United States Patent
Beck et al.

(10) Patent No.: US 11,336,437 B2
(45) Date of Patent: May 17, 2022

(54) TERMINAL IDENTITY PROTECTION METHOD IN A COMMUNICATION SYSTEM

(71) Applicant: MYRIOTA PTY LTD, Adelaide (AU)

(72) Inventors: Andrew Beck, Adelaide (AU); Robert George McKilliam, Adelaide (AU)

(73) Assignee: MYRIOTA PTY LTD, Adelaide (AU)

( * ) Notice: Subject to any disclaimer, the term of this patent is extended or adjusted under 35 U.S.C. 154(b) by 52 days.

(21) Appl. No.: 16/643,486

(22) PCT Filed: Aug. 28, 2018

(86) PCT No.: PCT/AU2018/000150
§ 371 (c)(1),
(2) Date: Feb. 28, 2020

(87) PCT Pub. No.: WO2019/040963
PCT Pub. Date: Mar. 7, 2019

(65) Prior Publication Data
US 2020/0195427 A1     Jun. 18, 2020

(30) Foreign Application Priority Data

Aug. 28, 2017 (AU) ................................ 2017903469

(51) Int. Cl.
*H04L 9/08* (2006.01)
*H04L 9/32* (2006.01)
*H04L 29/06* (2006.01)

(52) U.S. Cl.
CPC .......... *H04L 9/0847* (2013.01); *H04L 9/0836* (2013.01); *H04L 9/0866* (2013.01);
(Continued)

(58) Field of Classification Search
CPC ... H04L 9/0847; H04L 9/0836; H04L 9/0866; H04L 9/0872; H04L 9/3242; H04L 63/0435; H04L 9/3239; H04L 2209/42
See application file for complete search history.

(56) References Cited

U.S. PATENT DOCUMENTS 10,505,907 B2 * 12/2019 Jarchafjian ............. G06F 21/44
2002/0073345 A1    6/2002 Esfahani
(Continued)

*Primary Examiner* — Matthew Smithers
(74) *Attorney, Agent, or Firm* — Seed IP Law Group LLP

(57) ABSTRACT

A method for determining a terminal ID from a message received from a terminal in a communication system avoids sending the terminal ID in the clear. In this system each terminal ID has an associated encryption key. A transmitted message comprises at least a Message Authentication Code (MAC), a n-bit hash, and encrypted message text. At least the terminal key and a nonce is used to generate the MAC, and neither the terminal ID or the terminal key are included in the transmitted message. An authentication broker stores the set of all (terminal ID, terminal key) pairs for the plurality of terminals in the communication system. The set of all terminal keys is grouped into at least two partitions, and on receipt of a message the authentication broker identifies the partition that includes the terminal key of the terminal that transmitted the received message using the n-bit hash (the search partition). The authentication broker then searches the search partition for the terminal key that authenticates the MAC to identify the terminal ID. In some embodiments the nonce is not included in the message but is known or obtainable by the terminal and the authentication broker. A partitioning function generates the «-bit hash from at least the nonce and a terminal key. In some embodiments the nonce is included in the received message and a partitioning function generates the n-bit hash by using the nonce to select n bits from the terminal ID. In some embodiments the partitions are arranged into hierarchical groups such as tree, and each node has a partition key, and the n-bit has is formed as the ordered set of MACs for the partition keys on the path from the root node to the leaf node partition that includes the terminal key.

25 Claims, 8 Drawing Sheets

(52) U.S. Cl.
CPC .......... *H04L 9/0872* (2013.01); *H04L 9/3242*
(2013.01); *H04L 63/0435* (2013.01)

(56) References Cited

U.S. PATENT DOCUMENTS

| | | | |
|---|---|---|---|
| 2004/0193891 A1 | 9/2004 | Ollila | |
| 2007/0180247 A1* | 8/2007 | Leech | H04L 63/08 713/171 |
| 2008/0304456 A1* | 12/2008 | Iino | H04W 12/02 370/338 |
| 2009/0024848 A1* | 1/2009 | Takasugi | H04L 9/3236 713/169 |
| 2010/0161999 A1 | 6/2010 | Poovendran et al. | |
| 2010/0228981 A1* | 9/2010 | Yao | H04L 9/0838 713/171 |
| 2020/0145402 A1* | 5/2020 | Anantha | H04W 12/06 |

\* cited by examiner

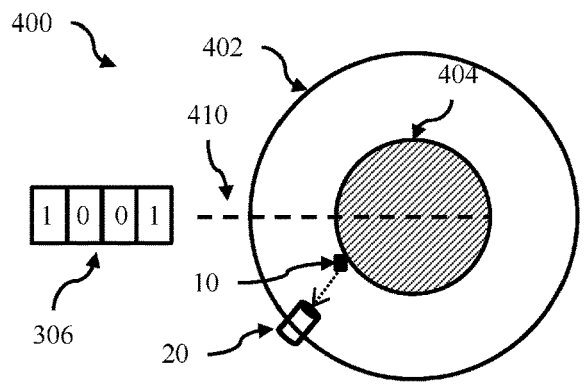
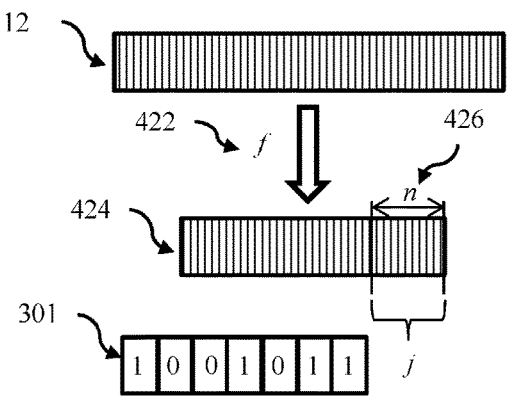
Figure 4A                    Figure 4B
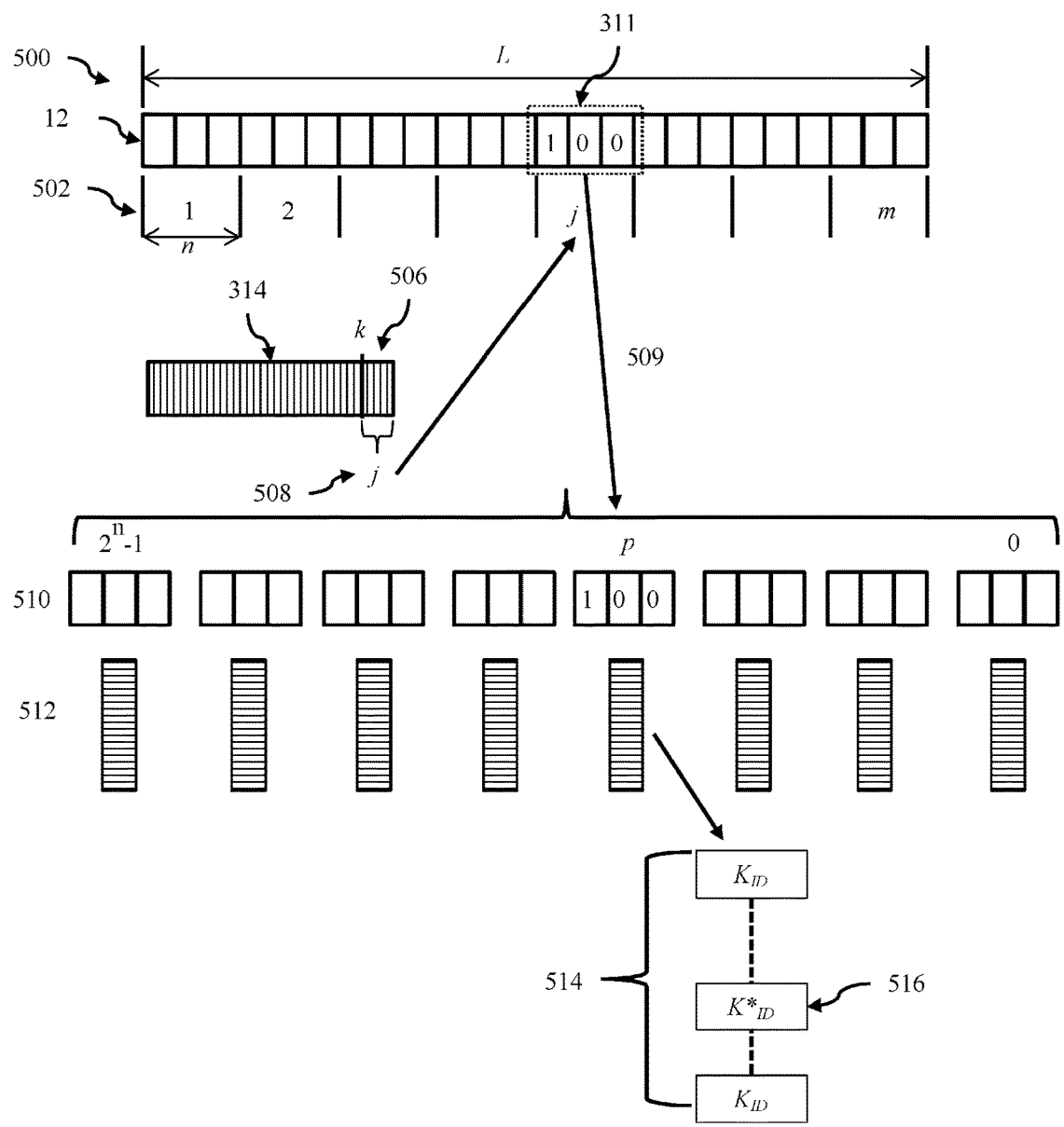
Figure 5

Algorithm EAX.Encrypt$_K^{N,H}(M)$

10  $\mathcal{N} \leftarrow \text{OMAC}_K^0(N)$
11  $\mathcal{H} \leftarrow \text{OMAC}_K^1(H)$
12  $C \leftarrow \text{CTR}_K^{\mathcal{N}}(M)$
13  $\mathcal{C} \leftarrow \text{OMAC}_K^2(C)$
14  $Tag \leftarrow \mathcal{N} \oplus \mathcal{C} \oplus \mathcal{H}$
15  $T \leftarrow Tag$ [first $\tau$ bits]
16  return $CT \leftarrow C \| T$

Figure 6A

Algorithm EAX.Decrypt$_K^{N,H}(CT)$

20  if $|CT| < \tau$ then return INVALID
21  Let $C \| T \leftarrow CT$ where $|T| = \tau$
22  $\mathcal{N} \leftarrow \text{OMAC}_K^0(N)$
23  $\mathcal{H} \leftarrow \text{OMAC}_K^1(H)$
24  $\mathcal{C} \leftarrow \text{OMAC}_K^2(C)$
25  $Tag' \leftarrow \mathcal{N} \oplus \mathcal{C} \oplus \mathcal{H}$
26  $T' \leftarrow Tag'$ [first $\tau$ bits]
27  if $T \neq T'$ then return INVALID
28  $M \leftarrow \text{CTR}_K^{\mathcal{N}}(C)$
29  return $M$

Figure 6B

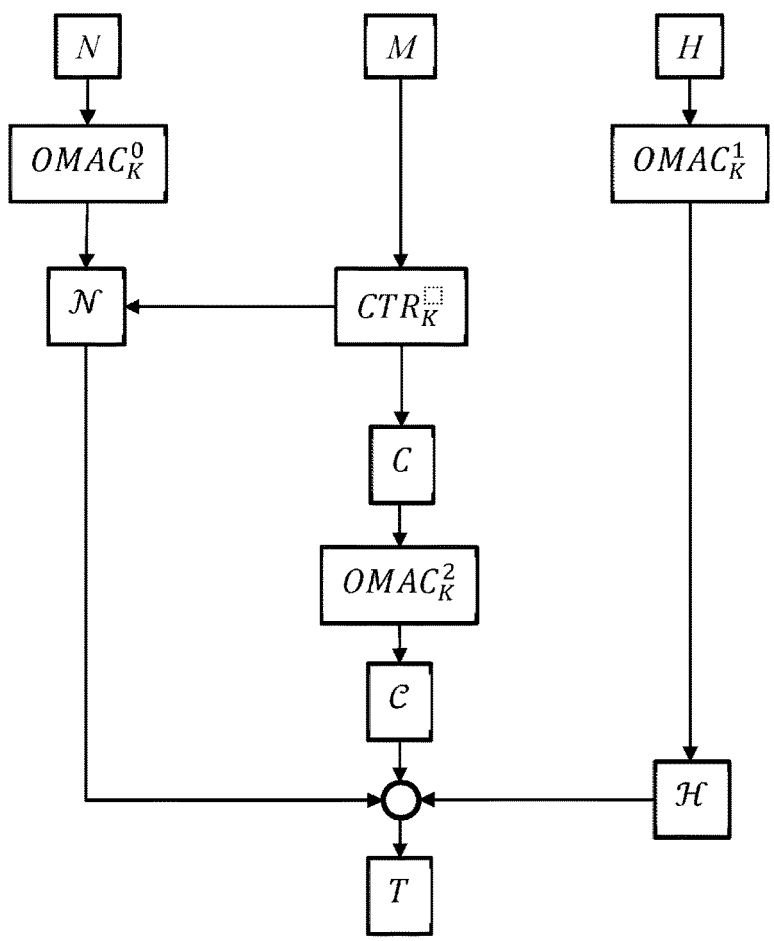

Figure 6C

TERMINAL IDENTITY PROTECTION METHOD IN A COMMUNICATION SYSTEM

PRIORITY DOCUMENTS

The present application claims priority from Australian Provisional Patent Application No. 2017903469 titled "Terminal Identity Protection Method in A Communication System" and filed on 28 Aug. 2018, the content of which is hereby incorporated by reference in its entirety.

BACKGROUND

Technical Field

The present disclosure relates to communication systems. In a particular form the present disclosure relates to methods for securely identifying terminals in a satellite communication system.

Description of the Related Art

In many communication systems, terminals are assigned a unique Terminal Identifier (or Terminal ID) which is included in every message. However this terminal ID typically takes up tens of bits and in some satellite communication or low power communication systems it is desired to keep packets as short as possible. Furthermore, the terminal identifier is almost always sent unencrypted. This allows a receiver to determine if the transmitting terminal is a valid terminal or system user (and thus the message should be accepted as genuine and processed). In some systems the message body is encrypted, and sending the terminal ID in clear allows the receiver to select the correct terminal key to authenticate and decrypt the remainder of the message. However one problem with this approach is that by sending the terminal identifier unencrypted, an adversary can identify and potentially track the terminal.

One approach that can be used to mitigate adversary identification and tracking is to allocate a set of identifiers (i.e., a pool of identifiers) to a terminal or set of terminals and have the terminal select the terminal identifier from this set (which is known to the receiver). However whilst this reduces the ability of an adversary to track a terminal, it does not eliminate the problem, particularly if the pool is small and the adversary is able to monitor transmission on an extended basis to determine pools. Another approach is to use a public/private key encryption to derive a 'shared secret' key. However this generally requires additional data to be sent in the message body. Yet another approach is for the terminal to encrypt and transmit a set of terminal ID and/or key pairs which will be used in the future. However such an approach leads to synchronization issues, as if a message is lost then the set of future keys are lost. This is a particular issue in a uni-directional communications channel where message acknowledgements are not possible (or not provided). Further periodically resending the pool of keys consumes additional bandwidth.

There is thus a need to provide improved methods for identifying terminals in satellite communication systems, or at least to provide a useful alternative to existing systems.

BRIEF SUMMARY

According to a first aspect, there is provided a method for determining a terminal ID from a message received from a terminal in a communications system, the method comprising:

receiving, by an access node in a communication system comprising a plurality of access nodes, an authentication broker operatively connected to the plurality of access nodes, and a plurality of terminals, a message transmitted from a terminal having a unique terminal identifier (ID), and terminal key, wherein the received message comprises at least a Message Authentication Code (MAC), a n-bit hash, and encrypted message text, and where at least the terminal key and a nonce is used to generate the MAC, and neither the terminal ID or the terminal key are included in the transmitted message;

providing at least the received Message Authentication Code (MAC) and n-bit hash to the authentication broker, wherein the authentication broker stores the set of all (terminal ID, terminal key) pairs for the plurality of terminals in the communication system;

partitioning the set of terminal keys into at least two partitions, and identifying a search partition including the terminal key of the terminal that transmitted the received message using the n-bit hash;

searching the search partition for the terminal key that authenticates the MAC; and identifying the terminal ID using the terminal key that that authenticates the MAC.

In one form, the nonce is not included in the received message and a predefined partitioning function known to the terminal and the authentication broker is used to generate a n-bit hash from at least the nonce and a terminal key, and the method further comprises the step of obtaining the nonce, wherein the nonce is obtained using either system information known to, or estimable by the authentication broker, or common information known to, or estimable by, both the terminal and the authentication broker.

In a further form, partitioning the set of terminal keys comprises generating, for each terminal a n-bit test value by using the obtained nonce with the terminal key as inputs to the predefined partitioning function, and grouping terminals with the same n-bit hash, and the step of identifying the search partition comprises selecting the partition with terminals whose n-bit test value matches the received n-bit hash. In a further form the predefined function is $OMAC_K^3$(Nonce) where K is the corresponding terminal key.

In a further form, the nonce is obtained by analyzing historical spatial, temporal, or spatio-temporal transmission patterns of terminals. In a further form, the method further comprises estimating a geographic region from which the transmission was received, and selecting the nonce is performed using the last known position for each terminal in the system over a predefined time window, and the search partition contains the terminals whose last known position was within the estimated geographic region. In another form obtaining the nonce is performed using timing or frequency patterns of transmissions terminal in the system, and the search partition is identified based on the time of the received transmission.

In one form, the nonce value is obtained by determining a current value of a counter at a time determined with respect to the transmission time of the message, wherein the counter is based on a parameter of the satellite orbit known to the receiver and transmitter, and is counted with respect to a predetermined reference time and increment point. In a further form, the counter is an orbit count for the satellite in the plurality of satellites at the time of transmission of the message, wherein the reference time is a reference epoch and the increment point is a predetermined orbital reference point. In a further form, the orbit count is determined from ephemeris data for the satellites in the satellite communication network. In a further form, the plurality of access nodes comprises a plurality of satellite access nodes, and the satellite on which the counter is based is one of the plurality of satellite access nodes.

In one form, the number of partitions is two and the partitioning and searching are performed concurrently by iterating through the set of all terminal keys by:

calculating, for a terminal, an n-bit test value obtained from applying the predefined partitioning function to the terminal key and nonce;

determining, for a terminal, if the n-bit test value matches the received n-bit hash, and if the n-bit test value matches the received n-bit hash then determining if the terminal key and nonce successfully authenticate the MAC.

In one form the nonce is included in the received message and a predefined partitioning function known to the terminal and the authentication broker is used to generate a n-bit hash by using the nonce to select n bits from the terminal ID, and the step of partitioning the set of terminal keys comprises generating, a n-bit test value for each terminal by using the received nonce and terminal identifier as input to the predefined partitioning function, and grouping terminals with the same n-bit hash, and identifying the search partition comprises selecting the partition with terminals whose n-bit test value matches the received n-bit hash. In a further form the nonce is generated from a pseudo random source by the terminal.

In a further form the predefined partitioning function generates an n-bit test value from the nonce and a terminal identifier by:

partitioning the terminal identifier into m n-bit non-overlapping portions;

calculating the value j modulo m of a predefined k-bit portion of the nonce, subject to the requirement that $2^k \geq m$ and selecting the j modulo m n-bit portion of the L bit terminal identifier.

In a further form, the predefined k-bit portion of the nonce is the first or last k-bit portion of the nonce.

In one form, the partitioning is based on analyzing historical spatial, temporal, or spatio-temporal transmission patterns of terminals In one form, the nonce is included in the received message and partitioning the set of terminal keys comprises generating m partitionings prior to receiving a message, and where the jth partitioning of the m partitionings is obtained by:

selecting the jth n-bit portion of each terminal identifier, and grouping terminals with the same jth n-bit portion of their terminal identifier to form $2^n$ partitions, for each j=1 . . . m; and upon receiving a message calculating the value j modulo m of a predefined k-bit portion of the nonce, subject to the requirement that $2^k \geq m$, and identifying the search partition comprises selecting the partition in the jth partitioning of the m partitionings which is comprised of terminal keys in which the n-bit portion of their terminal identifier matches the received n-bit hash.

In one form, the nonce is a 16 bit nonce value, and n is 7. In one form the MAC is 30 bits.

In one form, each of the at least two partitions has an associated partition key, and the n-bit hash is a partition Message Authentication code (pMAC) generated from a partition key for the search partition, and identifying the search partition comprises searching the set of partition keys for the partition key that authenticates the received pMAC.

In one form, the at least two partitions are a plurality of partitions grouped into a tree to form a plurality of hierarchical partition layers, where each partition has an associated partition key, and the n-bit hash is an ordered combination of each partition Message Authentication code (pMAC) generated from each partition key at each layer in a search path traversing the tree from a root node to a leaf node comprising the search partition, and identifying the search partition comprises traversing the tree by searching the set of partition keys at each layer of the tree for the partition key that authenticates the received pMAC associated with the layer determined from the ordered combination, wherein the leaf node whose partition key authenticates the received pMAC associated with the leaf node layer is the search partition.

In one form, the at least two partitions are a plurality of partitions grouped into a tree to form a plurality of hierarchical partition layers, where each partition except leaf node partitions have an associated partition key, and leaf node partitions each comprises a single terminal key, and the n-bit hash is an ordered combination of each partition Message Authentication code (pMAC) generated from each partition key at each layer in a search path traversing the tree from a root node to a leaf node, and identifying the search partition comprises traversing the tree by searching the set of partition keys at each layer of the tree for the partition key that authenticates the received pMAC associated with the layer determined from the ordered combination, until a set of leaf nodes are obtained, and the search partition is the leaf node partition for which the terminal key authenticates the MAC of the terminal.

In a further form the ordered combination is the order obtained from traversing the tree from the root node to the leaf node and the n-bit hash is a concatenation of each pMAC in the search path to the search partition.

In one form the terminal identifier is 128 bits and the terminal key is either 128 or 256 bits. In one form, the number of partitions is more than 100.

In a further form, a plurality of predefined partitioning functions are used to partition the set of terminal keys, and the message further comprises at least a 1 bit indicator field which is used by the authentication broker to determine which predefined partitioning function from the plurality of predefined partitioning functions is to be used to partition the set of terminal keys.

In one form, the communication system is a satellite communication system and the plurality of access nodes comprises a plurality of satellite access nodes.

According to a second aspect, there is provided a method for generating an authenticated message by a terminal for transmission to an access node in a communications system comprising a plurality of terminals, a plurality of access nodes and an authentication broker, wherein each terminal stores a unique terminal identifier (ID) and terminal key and the authentication broker stores the set of (terminal ID, terminal key) pairs for each of the plurality of terminals, the method comprising:

generating a nonce value;

encrypting a message for transmission using a terminal key stored by the terminal and the nonce value to obtain encrypted message text or obtaining encrypted message text for transmission;

generating, by the terminal, an n-bit hash using a predefined partitioning function that either generates the n-bit from the at least the terminal key and the nonce or that generates n-bit test value by selecting n bits from the terminal ID, or where the n-bit comprises one or more partition Message Authentication code (pMAC) generated from a partition key associated with a partition that comprises the terminal key; and generating a Message Authentication Code (MAC) using at least the nonce and the terminal key; and transmitting to an access node in the plurality of access nodes, by the terminal, a message comprising at least the n-bit hash, the MAC, and the encrypted message text.

In one form, the nonce value is determined using common information known to, or estimable by, both the terminal and the authentication broker, and the nonce is not transmitted, and a predefined partitioning function generates the n-bit hash from the at least the terminal key and the nonce. In a further form, the nonce is obtained by determining the current value of a counter at a time determined with respect to the transmission time of the message, wherein the counter is based on a parameter of the satellite orbit known to the receiver and transmitter, and is counted with respect to a predetermined reference time and increment point, and the nonce is not transmitted. In one form, the counter is an orbit count for the satellite at the time of transmission of the message, wherein the reference time is a reference epoch and the increment point is a predetermined orbital reference point. In one form, the n-bit terminal hash is obtained using $OMAC_K^3$ (nonce) where K is the corresponding terminal key. In one form, the n-bit terminal hash is first or last 7 bits of the output hash from the CSPRNG.

In one form, the nonce is generated from a pseudo random source and is transmitted in the message, and the predefined partitioning function generates the n-bit terminal hash by selecting n bits from the terminal ID. In a further form generating the n-bit terminal hash comprises:

selecting a predefined k-bit portion of the nonce;

partitioning the terminal identifier into m n-bit non overlapping portions subject to $2^k \geq m$ calculating the value j modulo m of the k-bit portion of the nonce value;

selecting the $j^{th}$ n-bit portion of the terminal identifier as the n-bit terminal hash.

In one form, the partition function further groups a plurality of partitions into a tree comprising a plurality of hierarchical partition layers, and a partition key is associated with each partition, and the n-bit hash is an ordered combination of each partition Message Authentication code (pMAC) generated from each partition key at each layer in a search path traversing the tree from a root node to a leaf node partition comprising the terminal key.

In one form, the nonce is generated from the encrypted message text and the MAC is used to sign the encrypted message text and the n-bit hash. In one form, the MAC is 30 bits and n is 7.

In the above methods, the access nodes may be satellite access nodes, and the communication system may be a satellite communication system. According to further aspects, there is provided an authentication broker apparatus comprising a processor and a memory comprising instructions to configure the processor to implement the method of the first aspect, a terminal apparatus comprising an antenna, communications hardware, a processor and a memory comprising instructions to configure the processor to implement the method the second aspect, and communication system comprising a plurality of terminals, a plurality of access nodes, which may be a plurality of satellites; and an authentication broker apparatus. According to further aspect there is provided a method of generating unique terminal identifiers and registering terminals in the network.

BRIEF DESCRIPTION OF THE SEVERAL VIEWS OF THE DRAWINGS

Embodiments of the present disclosure will be discussed with reference to the accompanying drawings wherein:

FIG. 4A is a schematic drawing of determination of a nonce value according to an embodiment;

FIG. 4B is a schematic drawing of determination of a n-bit terminal hash according to an embodiment;

FIG. 5 is a schematic drawing of determination of a nonce and an n-bit terminal hash according to an embodiment;

FIG. 6A is an algorithm for encryption using the EAX-AES encryption scheme;

FIG. 6B is an algorithm for decryption using the EAX-AES encryption scheme;

FIG. 6C is a schematic diagram of encryption of a message M using the EAX-AES encryption scheme;

In the following description, like reference characters designate like or corresponding parts throughout the figures.

DETAILED DESCRIPTION

Figure 1:
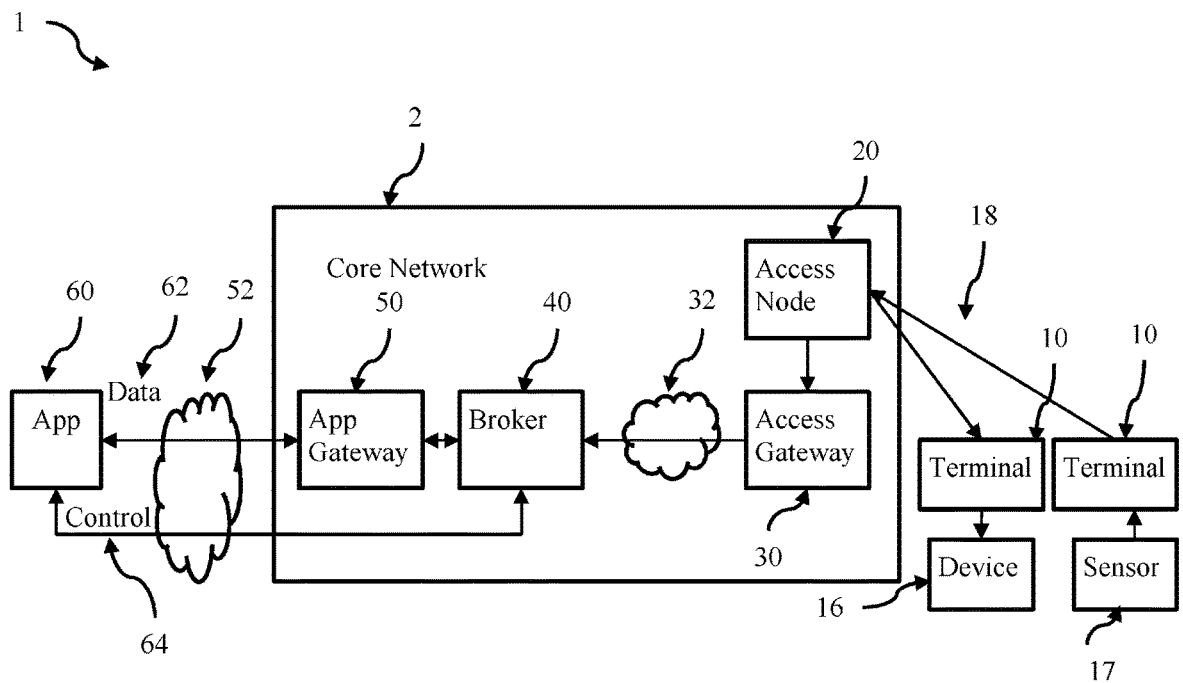
FIG. 1 is a schematic diagram of a communication system according to an embodiment.

Referring now to FIG. 1, there is shown a communications system according to an embodiment. In this communication system message packets sent by terminals are digitally signed by the terminal using a terminal key to allow the authenticity of messages to be checked at the receiver (i.e., the receiver verifies that a received message was sent by a terminal known or registered with the system). Additionally and to provide improved security terminal identifiers are omitted (i.e., not included) in transmitted messages. This creates a potential computation burden on the receiver, as it must search the complete set of terminal keys to identify the terminal key which authenticates the message. Thus to assist the receiver, the set of all possible terminal keys is partitioned, and methods are provided to allow the receiver to determine which partition contains the terminal key of the terminal that sent the transmission. The receiver then only needs to search this partition to find the key that authenticates the received message, thereby reducing the computational cost (or burden) on the authentication step. This and other features of the communication system will now be discussed.

The communication system shown in FIG. 1 may equivalently referred to as a communications network. In some embodiments the communication system is a satellite communication system. This system or network uses a publisher subscriber model, and comprises the following system (or network) entities:

Terminals 10: A communication module within a terminal provides core network connectivity to access nodes. Terminals 10 may have both devices 12 and sensors 14 attached. These may be physically attached or integrated, or operatively connected to the terminal over a local wired or a local wireless link.

Devices 12: These entities receive data to which they are subscribed via the authentication broker.

Sensors 14: These entities publish data with no awareness of other network nodes. Sensors may also be able receive ephemeral control data, publish ACK messages, etc.

Access Node 20: A plurality of access nodes provide wireless communications with a plurality of terminals. In some embodiments the access nodes are satellite access nodes. In other embodiments the access nodes are a combination of mostly satellite access nodes with some terrestrial base stations. In other embodiments the access nodes are a combination of satellite, airborne and terrestrial access nodes. In some embodiments the access nodes are terrestrial access nodes. Access nodes provides access to the core network 2.

Access Gateway 30: These act as gateways between Access Nodes and the Authentication Broker. The gateway may be combined with the Access Node 20 (for example on board a satellite).

Authentication Broker 40: Broker between Publishers and Subscribers. Brokers authenticate that received messages are from registered terminals and determine the terminal ID.

App Gateway 50: Data gateway between Applications 60 and the Broker 40, implementing a number of interfaces. This may be a cloud based interface. Interfaces include a Message Queue Telemetry Transport (MQTT) interface, forwarding to a customer controlled Endpoint; or a Customer accessible Endpoint.

Application 60: Customer applications. These communicate with the App gateway over wired and wireless links, for example to a cloud based App Gateway.

The network comprises a plurality of terminals 10 and a plurality of access nodes 20, such as satellite access nodes. The core network 2 comprises the access nodes (satellites and terrestrial), access gateway 30, the authentication broker 40 and the App Gateway 50. The broker 40 can exchange data 62 with applications 60 via App Gateway 50 and control information 64 directly with applications 60. The component of the core network 2 may be distributed and communicate over communications links. Some components maybe cloud based. The system is particularly suited to a satellite communication system in which most of the access nodes are satellite access nodes, however it will be understood that various embodiments may be used in other communication systems including those with various combinations of satellite access nodes, airborne access nodes, and terrestrial access nodes (including mobile terrestrial access nodes) or various combinations of the three, including purely airborne, or purely terrestrial access nodes.

As outlined above, to protect the identity of terminals, terminals do not include a terminal identifier in a transmitted message, and messages are signed with a message authentication code (MAC) which is generated using the terminal key and a nonce value, and the output MAC is included in the transmitted message. The MAC is then used by the receiver (and in particular the authentication broker) to verify that the message was sent by a registered or known terminal. This requires the receiver or authentication broker to know both the terminal key and nonce used to generate the MAC. The system implements methods for partitioning the set of all terminal keys and complimentary methods for determining the search partition which contains the terminal key of the terminal which sent a received message. This partitioning of the key space reduces the compute cost of attempting to authenticate a received message with every possible terminal key, allowing a restricted search to be performed thus making the method more computationally efficient. The partition to search may be referred to herein as the search partition. It could also be referred to as the source partition on the basis that it is partition which contains the terminal key of the terminal which sent the transmission. The determination of the search (or source) partition is performed on the receive side, and may be performed by a receiver such as an access node 20 itself, or it may be performed by an authentication broker 40 operatively connected to the receiver/access node, or some other module downstream of the receiver/access node. As will be discussed below to assist the authentication broker (or other receiver side entity) in this process, a partition identification code (or field) is included in the message. For the sake of convenience we will refer to this partition identification code as a n-bit hash, and may be generated by a cryptographic hash function or some other function or method. The partition identification code (or n-bit hash) will typically be a single field in the message frame but it will be understood that could be spread over multiple fields. The method used to generate the n-bit hash depends upon whether the nonce is to be included in the transmitted message or not. On the receiver side, the n-bit hash is used to determine the search partition for a received message, and the method used to generate a n-bit hash may also be used to partition the set of all terminals (for example to allow precomputation of the partitions). In one embodiment the n-bit hash is obtained from a function of the terminal key and nonce value (and optionally other information such as terminal ID) and the nonce is not included in the message. Instead the nonce is determined using system information known to, or derivable/estimable by the receiver, or using common information known to, or derivable/estimable by, both the transmitter and receiver, or the message may include information to assist the receiver in identifying the search partition. In other embodiments the nonce is generated by the terminal and included in the message and the n-bit hash is generated from the terminal ID according to a method known to both the transmitter and receiver. For example the terminal ID may be divided into m portions, a predefined portion of the nonce (known by both the terminal and authentication broker) used to determine which of the m portions of the terminal ID to use as the n-bit hash. Once the nonce is obtained the authentication broker can then partition the search terminals and use the n-bit hash to determine the search partition. Typically the terminal key will also be used to encrypt the message text sent in the message (referred to as ciphertext), and thus identifying the terminal key then allows the received ciphertext to be decrypted to allow recovery of the original message text. However in other embodiments the message text could be encrypted using a different key to the terminal key, in which case upon successful authentication that the message was sent by a known terminal, the ciphertext can be passed to a downstream system or end user entity or application, which knows the key used to encrypt the message text (and thus can decrypt the ciphertext).

Figure 2:
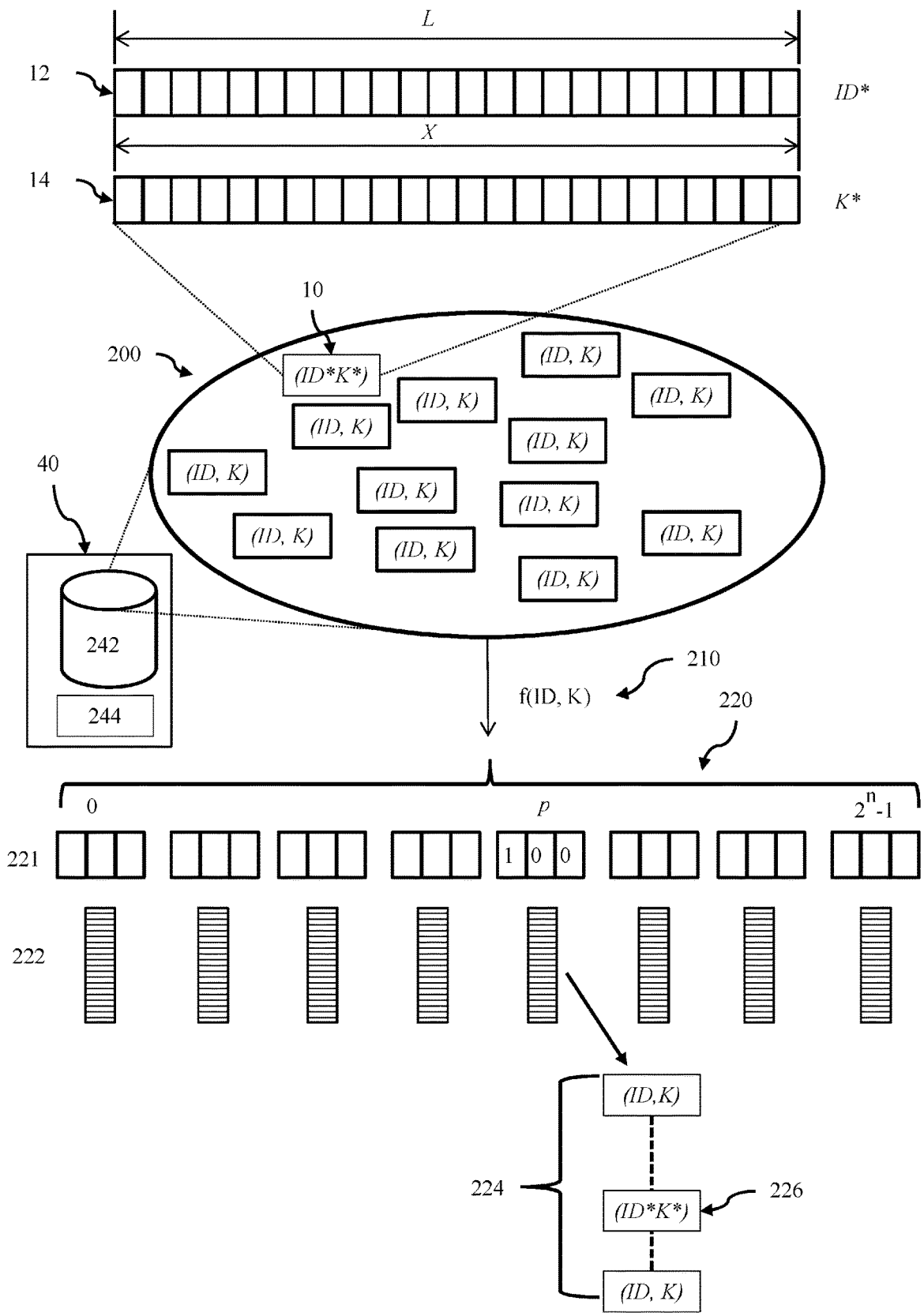
FIG. 2 is a schematic diagram illustrating grouping of terminal keys according to an embodiment.

FIG. 2 is a schematic diagram illustrating partitioning (or grouping) of terminal keys according to an embodiment. The system comprises a plurality of terminals and each terminal 10 is identified by a unique Terminal identifier (ID) 12 and has an associated Terminal Key K 14 which is used to digitally sign, and optionally encrypt, messages. The terminal key and a nonce is used to generate a message authentication code (MAC) which can be used to authenticate the message. In this embodiment the terminal key is also used to encrypt the message text to generate the ciphertext, and the ciphertext and MAC are included in the message that is transmitted. The receiver tests a candidate key to determine if it authenticates the MAC. In some embodiments the terminal ID is used with the terminal key in the encryption and authentication of the message. For example in embodiments where EAX authentication method is used, the terminal ID can be used as the input header. Thus in this case, both the terminal ID and terminal key are used to encrypt the text and generate the MAC, and are thus required for the authentication and decryption of the received message. However as terminal keys are paired with terminal IDs, identification of one allows identification of both. Thus for the sake of convenience we will generally refer to identifying or using the terminal key but it is to be understood that this is equivalent to identifying or using the terminal key and terminal ID due to the known pairings.

In some embodiments authentication (or verification) of the MAC returns a binary result (true/false). If the same terminal key was used to generate the MAC and encrypt the message text, then this terminal key that authenticates the MAC is used to decrypt the ciphertext. In some embodiments and authentication and decryption are performed as part of the same operation (if a candidate key does not validate the MAC, then either no decrypted text is returned, or any "decrypted" text is discarded as it not a true decryption back to the original message text). In cases where the message text was encrypted with a different key to the terminal key used to generate the MAC, then the received ciphertext is passed onto to a downstream entity for decryption by an entity which knows the key used to encrypt the message text. In this embodiment the terminal ID is a L bit string and the terminal key is X bits long. Typically L and X are powers of 2 and may be the same length (or different). For example L may be 128 bits and X may be 128 bits or 256 bits. However other suitable lengths may be used provided uniqueness within the system can be supported. These are typically created and assigned by the terminal manufacturer (although a network controller could perform this function). Together these form a (terminal ID, terminal key) pair which is stored by the terminal 10. As terminals are registered in the network, the authentication broker 40 stores (or is operatively connected to) a database 242 of all (terminal ID, terminal key) pairs 200 for terminals registered with the network. Alternatively the authentication broker may be able to calculate or determine the set of all (terminal key, terminal ID) pairs from information known to the network. This set of all terminal key are used to authenticate a message signature to verify the authenticity and integrity of a received message and, via the (terminal ID, terminal key) pair, to identify the terminal that transmitted the message. The authentication broker further comprises one or more processors 244 which can be configured to implement embodiments of the methods described herein. In some embodiments, this task, or all functionality of the authentication broker is performed directly within the Access Node, e.g., onboard a satellite, or downstream of the receiving apparatus.

Figure 7A:
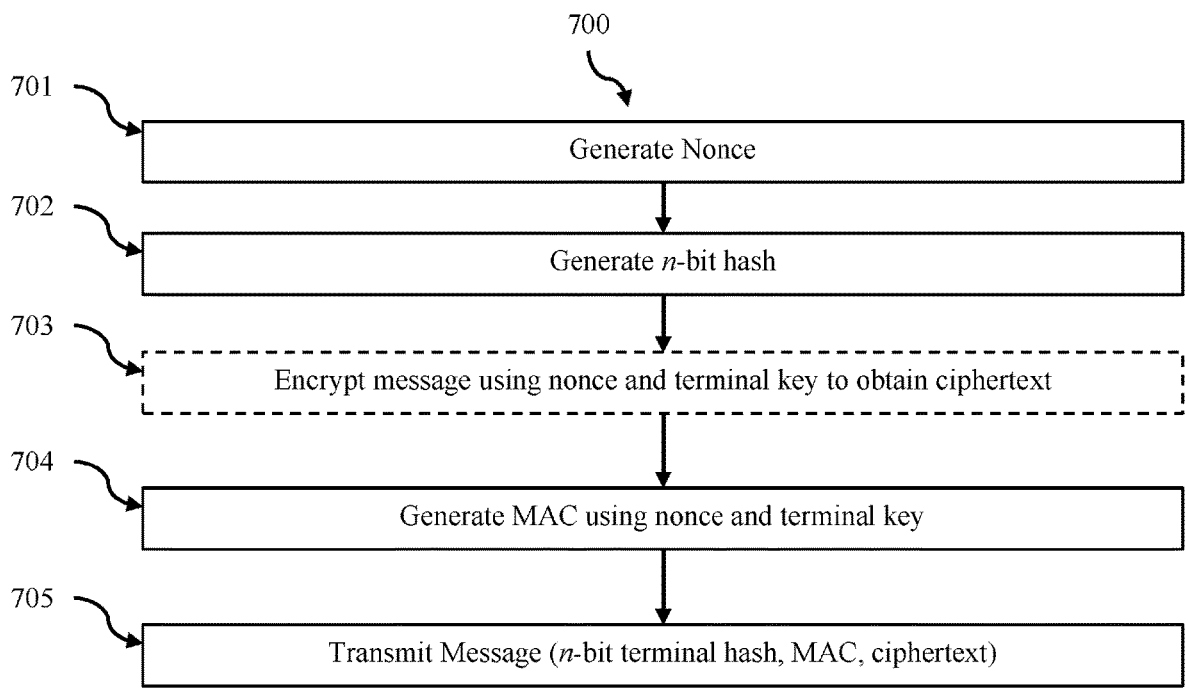
FIG. 7A is a flowchart of a method for generating a signed message according to an embodiment.
Figure 7B:
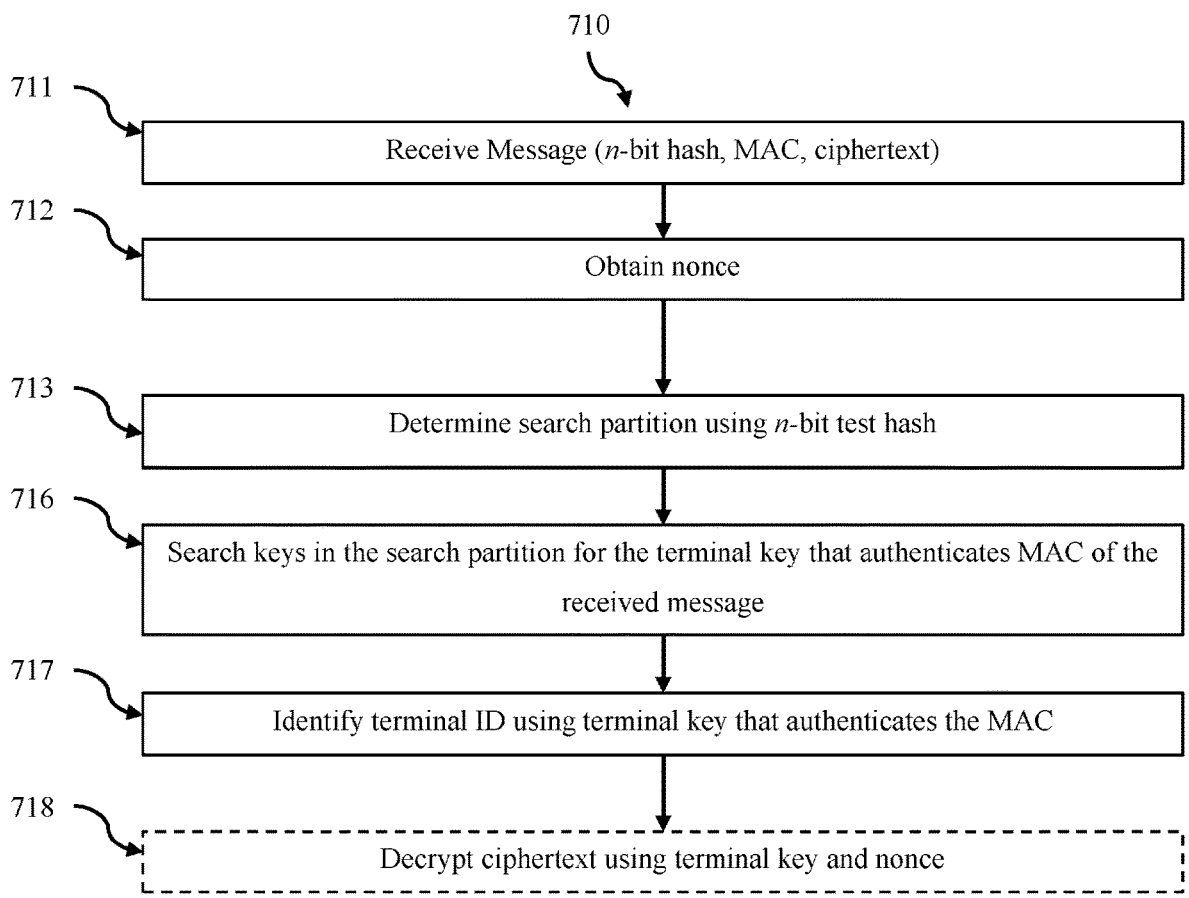
FIG. 7B is a flowchart of a method for determining a terminal ID according to an embodiment.

FIG. 7A is a flowchart of a (transmit side) method 700 for generating a signed message according to an embodiment, and FIG. 7B is a flowchart of a corresponding (receive side) method 710 for determining a terminal ID according to an embodiment. The method 700 broadly comprises generation of a Nonce value 701. This may be generated using information known to the terminal or it may be generated from a pseudorandom source, such as cryptographic hash function. At step 702 a n-bit terminal hash is generated. Depending upon how the nonce is generated, this may be generated using a cryptographic hash function of the nonce and terminal key, and optionally the terminal ID (for example using the $OMAC^3_K$ (Nonce) function of the EAX method or variant) or it may be generated from selected bits of the terminal ID. At optional step 703 the message text may also be encrypted using the nonce and terminal key to obtain encrypted message text, referred to as ciphertext. At step 704 a Message Authentication Code (MAC) is generated using the nonce and terminal key and at step 705 a message is composed and transmitted, where the message includes at least the a n-bit terminal hash, the ciphertext and the MAC. Additional information such as header may be included, but the terminal identifier is omitted. Depending upon the method, the nonce may be included or excluded from the transmitted message. The steps of encrypting the message and generating the MAC may be performed separately or together. In some embodiments the MAC is generated based on the encryption of the ciphertext, and the n-bit terminal hash is not authenticated. In other embodiments the MAC is generated such that it can be used to authenticate both the n-bit hash and the ciphertext. For example the encryption step 703 could encrypt a concatenation of the n-bit terminal hash and the message and generate a MAC that can be used to sign and authenticate both the ciphertext and the n-bit terminal hash. In one embodiment only the z-most significant bits of the MAC is included in the message.

FIG. 7B illustrates a corresponding receive side method to authenticate the message and identify the terminal ID of the terminal that sent the received message. A receiver such as satellite access node receives the transmitted message containing the n-bit terminal hash, MAC and ciphertext 711. The nonce is then obtained 712 either from the message or by independently determining the nonce used by the terminal. The receiver (or typically an authentication broker in or connected to the receiver) then determines a search partition that contains the terminal key that authenticates the MAC using the n-bit hash 713 and at step 716 searches the search partition for this key. This typically involves testing teach terminal key in the search partition to determine if it authenticates the MAC. If a terminal key is found that authenticates the MAC, then at step 717 we can identify the terminal ID using knowledge of the (terminal key, terminal ID) pairings. In one embodiment all the terminal keys in the search partition are tested and step 717 is only performed if a single key is found. If multiple keys are found that authenticate the message then the message is discarded. At optional step 718, the ciphertext is decrypted using the terminal key and nonce assuming corresponding encryption step 703 was performed. Authentication and decryption in steps 717 and 718 maybe performed concurrently or as separate operations. The decrypted message (or ciphertext if step 718 is not performed) can then be provided to another system entity for further processing (e.g., Gateway, and ultimately Apps 60).

Figure 7C:
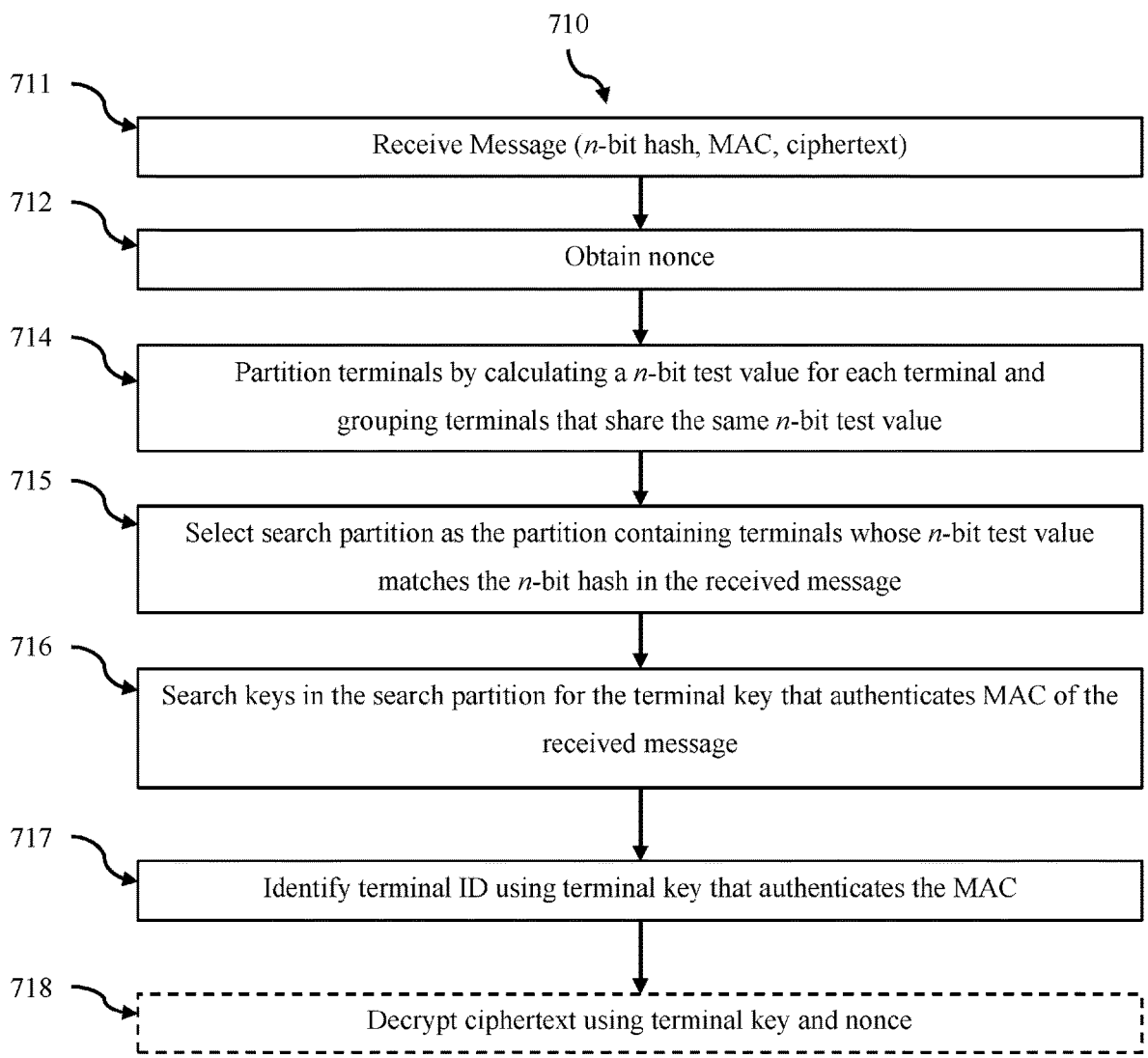
FIG. 7C is a flowchart of a method for determining a terminal ID according to another embodiment.

FIG. 7C shows a variant of the method shown in FIG. 7B. In this embodiment step 713 of determining the search partition using the n-bit hash is performed by first partitioning the terminals by calculating an n-bit test value for each terminal and then grouping the terminals that share the same n-bit test value to form a plurality of partitions 714. This partitioning may be done prior to receiving a message (pre-partitioning). For example the n-bit test values may be obtained from a cryptographic hash function of the nonce, terminal key and terminal ID, and thus if the receiver knows the nonce value that will be used it can partition the terminals prior to arrival of the message. At step 715 the search partition is selected as the partition containing terminals whose n-bit test value matches the n-bit terminal hash in the received message 711. This pre-partitioning of the terminal keys is shown in FIG. 2. The set of all terminals keys (or terminal ID, Key pairs) 200 is partitioned 210 into a plurality of partitions 220 where each partition 222 comprises a non overlapping group or subset of the terminal keys using a partitioning method as described herein. Each partition 222 may be labelled with a numeric partition index 221. A predefined partitioning function 210, which may be mapping function or mapping relationship may be known to both terminals 10 and Authentication Broker 40, or just to the Authentication Broker 40 uses at least the terminal key and/or terminal ID to partition the terminals. The number of keys in the partitions, which we will refer to as the size of the partition, need not be identical.

In some embodiments the partitioning function 210 partitions the set of all terminal keys 200 into two partitions. This may be into a search partition 224 which contains (or is expected to contain) the terminal key of the terminal that transmitted a received message, and a second partition containing all other terminals. The division of terminals into a search partition 224 and a second (non-candidate) partition may be based on a positive inclusion into the search partition of a terminals which are determined to have possibly transmitted the message based on some criteria or probability threshold, or the division may be based on positive exclusion of terminals into the second partition based on those terminals which are not expected to have transmitted the message, again based on some criteria or probability threshold. For example a loop could be performed through the set of all terminals (or other iterative search), with each terminal tested to determine if it is candidate terminal, and if so it is added to the search partition. Once the loop is complete, a search is performed through the terminals in the search partition until an authenticating key is found. The search may be a complete search (i.e., all keys in the search partition are tested) to ensure a single authenticating key is found. In other embodiments the partitioning is performed implicitly whilst iterating or looping through the set of all terminals by using a two stage testing approach. The set of all terminals are iterated (e.g., looped) through and a first candidate test determines if the terminal is possibly the transmitting terminal (i.e., a candidate terminal). Only if this test is passed is the more computationally expensive authentication test performed on this candidate terminal. Alternatively the first candidate test can determine if the terminal is definitely not the transmitting terminal, in which case the second authentication test is skipped and the next terminal is tested (i.e., this approach is similar to a bloom filter approach). This approach is efficient when the computational cost (i.e., time and/or resources) of the first candidate test stage is less than the second authentication test stage.

Figure 7D:
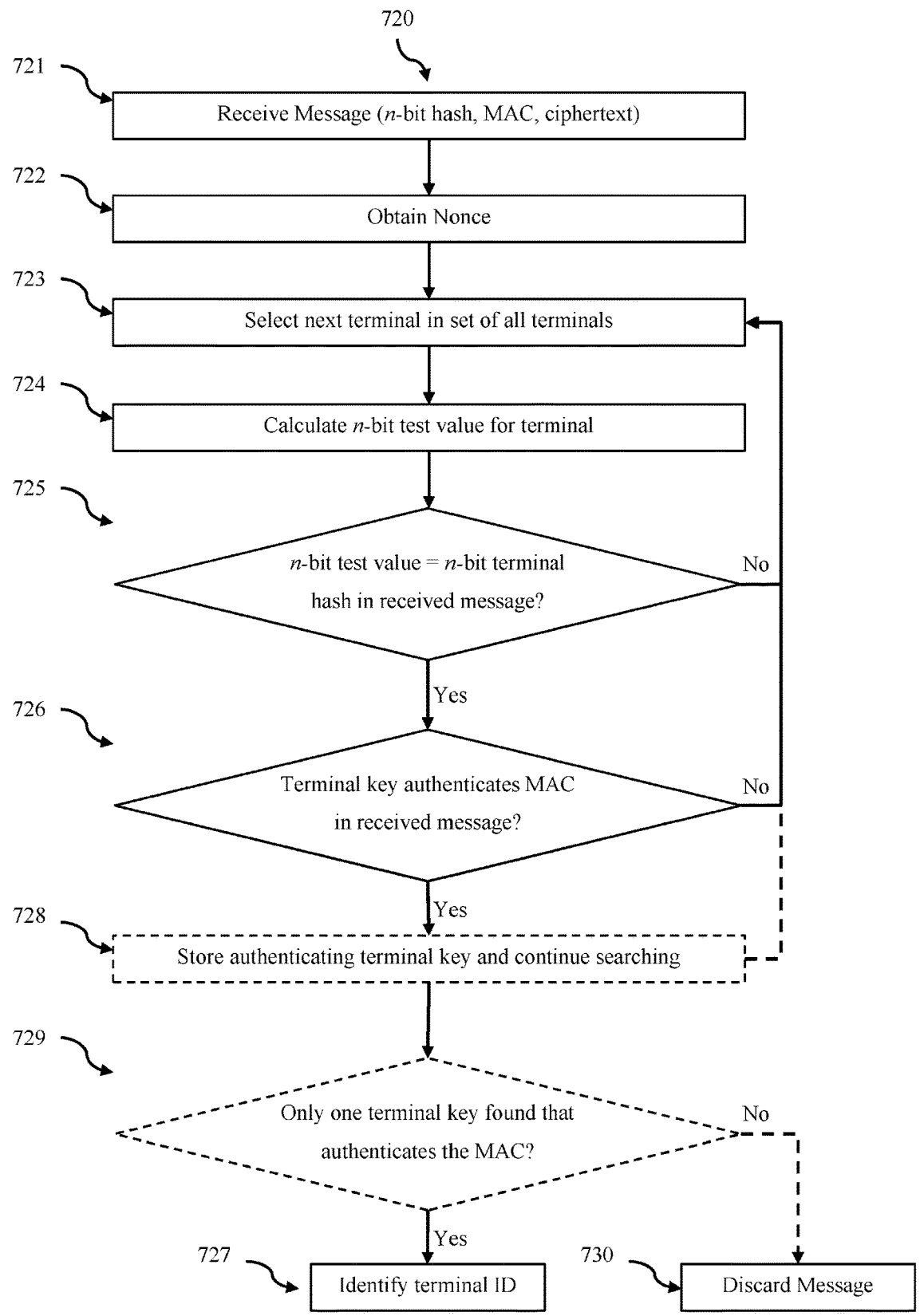
FIG. 7D is a flowchart of a method for determining a terminal ID according to another embodiment.

FIG. 7D shows a method of identifying a terminal ID 720 which is a variant of the method of FIG. 7B in which the partitioning and authentication tests are done implicitly (i.e., concurrently or on the fly), during a search through the set of all terminals. Steps 721 and 722 identical to steps 711 and 712 and at step 723 a loop through the set of all terminals is performed by selecting the next terminal in the set of all terminals. For each selected terminal, an n-bit test value is calculated for the terminal 724 and at step 725 this is compared with the received n-bit terminal hash. If they do not match, the loop iterates back to step 723 and the next terminal is selected. If however the n-bit test value matches the received n-bit terminal hash (yes), an authentication test is performed to determine if the terminal key authenticates the MAC in the received message 726. If the test fails (key does not authenticate MAC) then the loop iterates back to step 723 and the next terminal is selected. Once a key is identified that authenticates the MAC (yes), the search can be stopped (loop exited), and as before, the terminal ID is identified by looking up the terminal ID paired or associated with authenticating key (e.g., from database 242) 727. The ciphertext can then be decrypted or provided to another system entity for further processing (e.g., Gateway, and ultimately Apps 60). Optionally, rather than terminate the search after the first authenticating key is found, the authenticating terminal key is stored at step 728, and the search continues through the remaining terminals (i.e., back to step 723) until all possible terminal keys have been tested. Then at step 729 a test is performed to determine if only one terminal key was found that authenticated the MAC. If only one key was found (yes) then the message is verified and terminal ID found at step 727. However if multiple authenticating keys are found (no at step 729) then the message is discarded 730.

In other embodiments, the number of distinct partitions is much greater than 2, including hundreds or thousands of partitions. Again the size of the partitions need not be identical, although in some embodiments all partitions may be similar or identical sizes. Preferably the partitioning method is chosen to ensure the size of the search partition is much smaller than the size of the total key pool to enable efficient key searches to be performed during the authentication stage. For example with approximately equal size partitions, and assuming pre-partitioning of all terminal keys, then the efficiency gain is approximately equal to the number of partitions (e.g., 100 equal size partitions represents a 100 fold reduction in the number of terminal keys that need to be searched, and thus a hundred fold increase in search efficiency). In many instances the number of distinct partitions is a power of 2, or slightly less than a power of 2, to facilitated binary labelling and computational processing. For example, in the embodiment shown in FIG. 2, there are $2^n$ partitions (or groups or subsets) and the predefined mapping function 220 allocates each terminal to one of the $2^n$ partitions. For example in this case there are 8 partitions (n=3), and the transmitting terminal 10 (ID*, K*) is mapped or allocated to the $p^{th}$ partition 224 which in this case is the $4^{th}$ partition (binary representation 100). This $p^{th}$ partition 224 is the search partition and comprises a reduced set of terminal keys including the key of the transmitting terminal 226. A key search is performed of this group 224 wherein each key is tested (i.e., used) to see if it authenticates the MAC of the received message and decrypts the ciphertext. Once a key K* is identified that authenticates the MAC, the search can be stopped, and the terminal ID ID* is identified by looking up the terminal ID paired (or associated with) with the key (e.g., pair 226 in database 242). Alternatively all the terminal keys in the search partition are tested to ensure that key K* is the only key in the search partition that authenticates the MAC.

In some embodiments the obtaining the nonce is performed using either system information known to, or estimable (or derivable or determinable) by the authentication broker, or common information known to, or derivable or estimable by, both the transmitter and authentication broker. For example in some embodiments the nonce is omitted but is separately determined by the terminals and the authentication broker, and the predefined partitioning function uses the nonce and terminal key to generate n-bit hash. For example the n-bit may be obtained by $OMAC^3_K$ (Nonce). The authentication broker can determine the nonce and apply the predefined partitioning function to all the terminal keys to partition them The search partition is then identified based on a n-bit hash in the message. The system information may be the historical transmission patterns of terminals, such as spatial, temporal, or spatio-temporal. In this case the search partition is identified based on a parameter of the received transmission such as a time or geographic region from which the transmission originated, and/or a transmitter parameter such as the transmitter location or a configuration parameter such as when or how frequently a transmitter can transmit. These parameters partition the historical transmission patterns of terminals, and the specifics of any given transmission allow the search partition to be identified from the plurality of partitions. As mentioned above the authentication broker stores a database 242 of (terminal ID, terminal key) pairs. This information may be stored by the authentication broker in database 242 or it may be stored by another entity and made available to the authentication broker for partitioning. To encompass this latter case, we will use a broad interpretation of authentication broker to encompass such entities, i.e., the authentication broker may be a distributed entity and use share physical resources or databases with other system entities. In some embodiments the authentication broker database 242 is configured to store additional information on terminal transmissions, such as record of the last transmission in some time frame, or the last N transmissions, or alternatively some configuration parameter of the each terminal, such as any restrictions on when or how frequently a terminal can transmit (or retransmit). This information can then be used by the authentication broker to partition the terminals. These embodiments may be implemented using implicit partition and searching, i.e., iterating through the set of all terminals and performing partition and search tests, or the number of partitions may be more than 2, and typically much more than 2 such as 100's, 1000's or even 100,000. The size will depend upon the number of terminals and exact partitioning criteria used to achieve efficiencies over having to search all terminal keys.

In one embodiment historical spatial or spatio temporal patterns are used to partition the terminals, for example based on geographic related information. For example the terminal keys may be partitioned based on the last known geographic location of a terminal over some time window. For example this may be the most recent transmission (i.e., time window is up to the present time), or the most recent transmission in the last week, or up to some reference point in time, such as end of the previous day (0:00 UTC). If an estimate of a geographic region from which the transmission was received is available then the search partition is the partition that contains the terminals whose last known position was within the estimated geographic region. In this embodiment the total system geographic footprint is partitioned into a plurality of geographic partitions where each partition covers a distinct (non-overlapping) geographic region. The total system geographic footprint may be the entire globe, or a region of the globe or a country or group of countries where the communication system is supported. The terminals are allocated to these geographic partitions based on the last known position of each terminal either over some time frame (more recent transmission in last 24 hours or week) or based on the last transmission from a terminal up to a cut-off (or threshold) time point (0:00 UTC). The receiver then determines the geographic position of the transmission, and which partition contains this geographic region, and performs a key search of the terminals allocated to that partition. In some embodiments, the dimensions (or boundaries, or size) of the geographic partitions are based on estimates of the likely distribution of terminals and/or the size of the satellite footprint or error in position estimation. Preferably the geographic partitions each contain similar numbers of terminals.

In another variation, rather than pre-allocating terminals to predefined geographic partitions, the partitioning may be done based on the received transmission time and the dimensions (boundaries) of the region expected to include the transmitter at that transmission time. In this method, the transmission time is recorded, and an estimate made of the region expected to contain the transmitter. As outlined above this may be an estimate of the satellite footprint at the transmission time, or footprint based on signal processing of the received signal (e.g., angle of arrival based estimate), or a region defined by an error bound on an estimate position. Then the set of all terminals is partitioned into those terminals expected to be in the region, for example based on the last known position of each terminal in time frame or up to a cut off time point, and those not in the region (i.e., a search partition and a second or other partition). The terminal key search is then performed on the terminals expected to be in the region (i.e., in the search partition).

In another embodiment, partitioning could be performed based on historical transmission patterns of terminals, such as temporal, or spatio-temporal patterns. For example the terminals could be partitioned based on frequency of transmissions, so partitioning based on frequency ensures that the terminals which most frequently transmit are searched first, followed by those which transmit less frequently. In another embodiment limitations on when terminals may transmit may be imposed. For example some terminals may be configured to only transmit on certain days of the week, and thus terminals could be partitioned based on this known information. In another embodiment, terminals may be configured to space apart transmissions, for example making only one transmission per satellite pass or day, or some integer number of passes or days (1 every 5 passes, or 1 every 5 days). In this case the terminals could be partitioned based on when they last transmitted. Terminals could thus be partitioned into those which could potentially transmit, and a partition containing excluded terminals based on the time of their previous transmission. In other embodiments, the terminal may use probabilistic thresholds, where the probability of transmitting increases over time. For example a terminal may be prevented from transmitting again for 24 hours by setting a probability of transmission to zero, and then increasing the probability of transmission p over time. For example $p=0.01*t-0.24$ where t is time in hours since the last transmission by the terminal. By knowing the probability of transmission functions used by terminals, and the time since last transmission, the set of terminals can be partitioned based on the current probability of transmission at the transmission time (or hour of transmission time). For example the partitions could correspond to probability ranges (e.g., =1, 0.9 to 1, 0.8 to 0.9, etc.), and the search order progressing through the most probable to least probable partitions.

Additionally temporal data could be combined with spatial data. For example the last known position of a terminal, combined with restrictions on when the terminals can transmit could be used to partition the terminals into those which could have transmitted and those excluded from transmission based on position and last transmission time. Alternatively the partitions could be searched in order of likelihood (i.e., in the geographic region, and high probability of transmission first). In other embodiments, the terminals could also be restricted to only transmit to specific satellites in the constellation, or be configured to preferentially transmit to certain satellites, for example using probabilistic thresholds to make a decision on whether to transmit to a specific satellite. Thus the terminals could be partitioned based on which satellite received the transmission, and likelihood the terminal could have transmitted to the receiving satellite.

In another embodiment, the system may use an artificial intelligence or machine learning system to learn the transmission pattern of a set of terminals. For example a third party terminal manufacturer may obtain a license to manufacture terminals limited to only send two messages a day. The third party terminal manufacturer could configure the terminals to always send the two messages at the same time each day, or only during certain time windows. The third party terminal manufacturer may not be required to inform the authentication broker (or network administrator) about what times the terminals are configured to transmit, and instead the authentication broker (or receiver side system) can instead use an AI or machine learning system to study the transmissions from terminals over time, and determine transmission patterns (i.e., which terminals always transmit during a certain time frame). These learnt transmission patterns can then be used as the basis for partitioning the terminals.

As outlined above, in some embodiments the message comprises information to assist the receiver in identifying the search partition, such as a partition identification code. The partition identification code can be a plain text or binary identifier, or a n-bit hash which can be utilized to identify the search partition. The partition identification code may be a single field in the received message, or formed by combining several fields in the received message. In one embodiment the partitioning may be based on geographic location using predefined geographic partitions. In this embodiment the terminal determines it's approximate position and transmit an approximate position as the partition identification code. This may be using a sensor (GPS receiver or similar) or using a position of a nearby entity. If the position is known to high accuracy it may be truncated or rounded to an approximate position. Using an approximate position reduces the required message size (i.e., the number of bits to be included in the message) and also avoids identifying the exact location of the terminal (reducing potentially for theft or damage). For example the approximate position may be accurate to 1 km, 10 km or even 100 km. The accuracy may be determined based on system parameters and expected terminal distribution and density. Alternatively where the geographic partitions are fixed and known to the terminals, the terminal could identify the geographic partition it is within, and transmit the partition identifier for this geographic partition which the receiver can then use. These embodiments are based on the assumption that terminals are fixed or have not moved more than 1 or 2 geographic partitions since their last transmission. If the terminal has in fact moved more than expected, or the terminal is unable to determine its position, then the terminal could transmit a special partition identification code indicating a large movement or unknown position which will signal to the receiver (or authentication broker), that a full terminal key search will be required for this transmission.

In some embodiments both the terminal and authentication broker (or other receive side core network entity) independently determine a nonce value which is not included in the transmission but which the terminal and receiver can independently determine. For example the nonce value can be based on the receiving satellite's identifier and current orbit number. In another embodiment, a small amount of additional, non-identifying data is included in the message and used to identify the partition, or otherwise reduce the number of Terminal Keys to be searched to authenticate each message. The size of the additional data may be tuned to control computation complexity. Additionally a method is described to allow manufacturers to generate unique (Terminal ID, Terminal Key) pairs and for those terminals to securely register with the network.

Embodiments of the methods for determining a terminal ID from a transmitted message in which both the terminal and receiver determine a nonce will now be described with reference to FIGS. 2 to 7D. In this embodiment the message includes information in the form of a n-bit terminal hash, such as 7 bit hash which is used to identify the search partition and reduce the terminal key space to search. The predefined partitioning function 210 is a predefined mapping function that allows a n-bit test value p to be obtained based upon the terminal hash and nonce or from selected bits of the terminal ID. Terminals (in the set of all terminals) are divided into $2^n$ groups (or subsets) based on the n-bit value. That is each partition 222 is comprised of terminals with the same n-bit value, and this value is used as the partition label 221. Prior to transmission, the terminal uses the predefined partitioning function (or mapping relationship) to calculate an n-bit terminal hash, and is included in the transmission (e.g., in terminal hash field 301 or 311) along with the encrypted message text (ciphertext) and a Message Authentication Code (MAC). Thus the n-bit terminal hash acts as a partition identification code.

A satellite or access node receives the transmitted message and selects the partition (or group) 224 with the matching n-bit test value p, thus reducing the search space for the terminal key (i.e., to $\frac{1}{2^n}$ of the total search space if the partitions are of equal size). A key search is performed of this group 224 wherein each key is used (or tested) to see if it authenticates the MAC. Once a key 226 is identified that authenticates the MAC, the search can be stopped, and the terminal ID is identified by looking up the terminal ID associated with or paired with the key (e.g., from database 242). Alternatively the search continues until all the keys in the search partition are tested to ensure that only a single key authenticates the MAC. If more than one key authenticates the MAC the message can be discarded.

In some embodiments AES-EAX is used as the underlying encryption/authentication scheme (Bellare M., Rogaway P., Wagner D. (2004) The EAX Mode of Operation. In: Roy B., Meier W. (eds) Fast Software Encryption. FSE 2004. Lecture Notes in Computer Science, vol 3017. Springer, Berlin, Heidelberg, full version available at: http://www.cs.ucdavis.edu/~rogaway/papers/eax.html). AES-EAX which uses AES-CTR for encryption together with CMAC (built on AES block cipher) for authentication. FIGS. 6A and 6B are algorithm for encryption and decryption (respectively) using the EAX-AES encryption scheme, and FIG. 6C is a schematic diagram of encryption of a message M using a Nonce N and message header H according to the EAX-AES encryption scheme. This generates encrypted message text referred to as ciphertext CT (=C∥T) and a message authentication code MAC. In these figures OMAC refers to a one key MAC algorithm or function and CTR refers to a counter mode encryption algorithm or function. As shown in FIG. 6C AES-EAX takes the message header H as input and generates an encrypted header which is used in the encryption and authentication method. In one embodiment the terminal ID is used as the message header and thus whilst used to encrypt and authenticate the message, the terminal ID is not transmitted. Also in this case the terminal ID can be used on the receive side as part of the verification and decryption. However as terminal keys and terminal IDs are paired, knowledge of one implies knowledge of the other (i.e., knowledge of both). However there are a number of alternatives schemes that may be used including EAX2, GCM or CCM.

That is, the method comprises a satellite (or access node) receiving a message transmitted from a terminal. The received message comprises a n-bit terminal hash, a Message Authentication Code (MAC), and encrypted message text. The MAC included in the message may be the z-most significant bits of the MAC generated by the encryption/authentication scheme. In one embodiment the MAC is the 30 most significant bits of the EAX MAC. The terminal key K (or terminal key and terminal ID) is used to encrypt the message text and generate the MAC but neither the terminal ID or the terminal key are included in the transmitted message. The message, or at least the received n-bit terminal hash, Message Authentication Code (MAC), and encrypted message text are provided to an authentication broker. A nonce value is obtained and the authentication broker (or associated network component) is configured to calculate (for example using a configured processor 244) an n-bit test value for a terminal. This value is obtained from applying a predefined partitioning function or mapping relationship to the terminal identifier (ID). For a given terminal, the broker then determines if the n-bit test value matches the received n-bit terminal hash. If the n-bit test value matches the received n-bit terminal hash then the broker can determine (or check) if the terminal key and nonce successfully authenticate the MAC. If the terminal key successfully authenticates the MAC then the encrypted message text can be decrypted (if it was encrypted using the terminal key). The terminal ID and decrypted message text (or ciphertext) can then be provided to a system entity upstream of the authentication broker. The calculating and determining steps are performed for each of the plurality of terminals until a terminal is found having a terminal key that successfully authenticates the received MAC.

These test and validation operations can be performed iteratively (i.e., as each matching terminal is identified, it is tested to see if it validates the MAC) or it can be performed as separate steps. That is the calculating step is performed first for each of the terminals in the system so that $2^n$ (test) groups are formed. Once these are obtained the determination step comprises selecting the group with the n-bit test value that matches the received n-bit terminal hash, and testing each key for each terminal in the group until a terminal key is found that successfully authenticates the received MAC.

Two methods will now be described which vary based on whether the nonce value used to encrypt the message is included or omitted (not included) in the transmitted message. In embodiments where the nonce can be independently determined (or obtained) by both the terminals and authentication broker, the n-bit hash is determined from the terminal key and nonce (and possibly the terminal ID) using a predefined partitioning function 210 such as a cryptographic hash function. In embodiments where the nonce is generated from a pseudorandom source or generated by the terminal in a way that the authentication broker cannot determine, and the nonce is included in the message, then the n-bit terminal hash is obtained from selected bits of the terminal Identifier according to the predefined portioning function 210 which is known to both the terminals and authentication broker. A single bit indicator field (302, 312) can be used to distinguish between the two methods, and thus which partitioning method the authentication broker should use. For example the indicator field can be set to '0' for Method A or '1' for Method B (or vice versa). If multiple partitioning methods may be used, then the indicator field can be made wider (as required). In a system including the indicator field the message broker can use the value of this indicator field to determine which predefined partitioning method from the plurality of predefined partitioning methods should be used to partition the terminal keys (i.e., which authentication method to use). This indicator bit can be omitted or removed from the packets in systems that employ only a single one of the methods (as the predefined mapping function will also be known to both terminals and broker).

In the one method the nonce is separately determined by the terminal and receiver (for example using a quantized time stamp or orbit number) and is omitted from the transmitted message. In one embodiment the nonce is obtained by determining a current value of a counter at a time determined with respect to the transmission time of the message. The counter is counted with respect to a predetermined reference time (i.e., a zero time) and increment period or event which can be independently determined by the terminals and broker. For example the terminal could store the current value and this value can be looked up at the time of assembly of the message packet, which will typically be very shortly before the transmission time. In another embodiment the value of the counter could be determined at the expected time of transmission. Alternatively it could be calculated a regular reference time (e.g., every 10 minutes).

In one embodiment the counter is based on a parameter of the satellite orbit of the satellite the transmitter 10 transmit to (i.e., the receiving satellite) calculated at an estimated time of transmission of the message, wherein the reference time is a reference epoch and the increment point is a predetermined orbital reference point. In another embodiment rather than using a parameter of the satellite orbit of the satellite the transmitter transmits to for determining the value of the parameter, some other satellite in the system could be used according to some scheme. For example if there are 24 satellites then the satellite ID corresponding to the UTC hour at the time of transmission could be used as the satellite for which an orbital parameter is used to determine the counter value from. In one embodiment the orbit parameter is an orbit count and can be is determined from ephemeris data for the satellites in the satellite communication network. This is illustrated in FIG. 4A which is a schematic diagram of a satellite orbit 402 of a satellite 20 orbiting the earth 404 in a Low Earth Orbit which receives a transmission from a terminal 20 at a time t. A reference point 410, in this case each time the satellite passes over the equator is used to increment the counter 306 (in this case the counter is 1001=$9^{th}$ orbit). An epoch time may be set such as launch of the satellite. Other reference points are a ground station, or a line of latitude or longitude. This method can be used where orbital ephemeris data and published to the terminals and the terminals have a time reference synchronized with a network time. For example satellites may broadcast ephemeris data, which may be stored by terminals. In many cases the synchronization can be relatively coarse. In this embodiment the Nonce is the concatenation of the Satellite ID and the counter (orbit number) 306. If a downlink is available, the satellite could select and broadcast the nonce to be used by transmitting terminals.

In this embodiment where the Nonce is not transmitted the predefined partitioning function (or mapping relationship) comprises calculating a predefined hash function 422 of the Nonce 12 and at least the terminal key and then selecting a predefined n-bit portion 426 of the predefined hash of the Nonce 424 as the terminal hash 301. The predefined hash function is preferably a Cryptographically Secure Pseudo Random Number Generator (CSPRNG) which is used to obtain an output hash 424 from which predefined n-bit portion 426 can be selected. In one embodiment the predefined hash function is $OMAC_K^3$ (Nonce) where K is the corresponding terminal key. In one embodiment the predefined n-bit portion is the first or last 7 bits of the output hash. In the embodiment shown in FIG. 4B, the 7 bit terminal hash 301 has a value 1001011. In this embodiment the MAC is given by the 30 most significant bits of the EAX MAC, the Cipher Text is the AES-CTR encrypted block generated by EAX, the Nonce is deduced by the transmitter and the receiver using (Norad ID∥Orbit #), and the terminal hash is the last 7 bits of an ephemeral Terminal Hash generated via a CSPRNG such as $OMAC_K^3$ (Nonce). A replay attack could be performed within the same orbit, which just adds redundancy (which is a good thing). This embodiment keeps the terminal ID completely hidden and enables the use of a short message reducing the header overhead per message. In this embodiment the n-bit terminal hash acts as a partition identification code.

In another embodiment the Nonce 314 is included in the transmitted message (see FIG. 3B) so that it is available to the receiver. The nonce may be generated from a pseudo random source by the terminal. In one embodiment the nonce is generated from an encrypted counter or discarded bits of a MAC from a previous transmission, or from the ciphertext or MAC of the current message, from a counter, or from a Cryptographically Secure Pseudo Random Number Generator (CSPRNG). This embodiment is illustrated in FIG. 5. In this embodiment partitioning the terminals comprises calculating an n-bit test value for each terminal by using the received nonce and terminal identifier as input to the predefined partitioning function, and grouping terminals with the same n-bit hash, so that terminals with the same test value are placed in the same partition. Identifying the search partition comprises selecting the partition with terminals whose n-bit test value matches the received n-bit hash. The predefined partitioning function generates a n-bit test value from the nonce and a terminal identifier by:

partitioning the L bit terminal identifier 12 into m n-bit non-overlapping portions 502;

calculating the value j modulo m of a predefined k-bit portion 506 of the nonce value 314, subject to the requirement that $2^k \geq m$ and selecting the j modulo m n-bit portion of the L bit terminal identifier.

The terminals can then be allocated to the partition containing terminals that share this same n-bit test value (i.e., the j modulo m n-bit portion of the L bit terminal identifier 12). The search partition can then be identified by selecting the partition comprising terminals whose n-bit test value matches the received n-bit terminal hash 311. The terminals in the search partition can then be tested to see if they authenticate the message. In the case where partitioning and searching are performed concurrently by iterating through the set of all terminals, the n-bit test value is calculated as above and the method proceeds by:

determining if the n-bit test value (the jth n-bit portion of the terminal identifier) matches the received n-bit terminal hash 311. If there is a match then the key and nonce are tested to see if they authenticate the MAC.

The non-overlapping portions need not be adjacent nor regularly spaced. In this case each of the terminal and broker need to store the locations of each portion (e.g., start bit). The last k bits 506 of the Nonce 314 have a value j. The requirement that $2^k \geq m$ ensures that all possible portions can be used and applying modulo m to the value j (j % m) ensures values returned range from 0 to m. If m is a factor of 2 the modulo step can be omitted. In this embodiment the predefined k-bit portion of the nonce value is the last k-bit portion of the nonce but it can be the first k-bit portion, or other portion provided the location within the nonce value is known. In one embodiment the nonce is a 16 bit nonce value, and n is the last 7 bits. As shown in FIG. 5 the value j (or j % m) is the $5^{th}$ portion and has value 100=4. This n-bit wide jth portion of the terminal identifier will have a range of values from 0 to $2^n - 1$. Thus once the portion of the identifier to check is known (i.e., the jth portion), the set of all terminals can be divided into $2^n$ partitions or groups 510, with each partition (group) formed of terminals with the same jth portion value, but each having different keys. In this case the jth n-bit portion 508 of the terminal identifier has a value p (100=value 4) that matches the received n-bit terminal hash 311. This pth group 514 can then be searched for the terminal key 516 that authenticates the MAC message, and thus the terminal identifier of the terminal that send the message can be determined. However if the encrypted message (ciphertext) of the current message is used to determine the bits to select from the Terminal ID for the n-bit hash, then the MAC can be used to sign both the encrypted message and the n-bit hash (for example by calculating a MAC from the concatenation of the encrypted message and the n-bit hash).

In another embodiment, a pre-partitioning step could be performed prior to a message being received. In this embodiment m partitionings are performed. The jth partitioning of the m partitionings is obtained by selecting the jth n-bit portion of each terminal identifier, and grouping terminals with the same jth n-bit portion of their terminal identifier to form $2^n$ partitions. This is performed for j=1 . . . m. Then upon receiving a message we can calculate the value j modulo m of a predefined k-bit portion of the nonce (again subject to the requirement that $2^k \geq m$). We can identify the search partition as this is partition in the jth partitioning of the m partitionings which is comprised of terminal keys in which the n-bit portion of their terminal identifier matches the received n-bit hash.

In this embodiment the predefined portioning function uses a portion of the transmitted nonce to select a portion of the terminal identifier, and the value of this portion is used as the n-bit terminal hash in the message by the terminal. That is the function defines which bits of the nonce are used to determine which bits of terminal identifier are used to generate the n-bit hash Additionally the value of this portion of the terminal identifier is used to divide the set of all terminals into $2^n$ search groups. This embodiment thus enables reduction of the search space to allow identification of the transmitting terminal, without transmitting the full terminal ID. Whilst a small portion of the terminal identifier is transmitted there is not an obvious way to associate the transmitted Nonce with the terminal hash, or terminal (ID, Key) pair, even when repeated with a given terminal. Thus in this embodiment the n-bit terminal hash with the Nonce acts as a partition identification code. In these embodiments where the nonce is included in the message and the n-bit hash is n selected bits of the terminal ID (using some mapping function 210) the terminals may still be partitioned using partitioning methods described above such as using historical spatial (e.g., geographic), temporal or spatio temporal patterns, or orbital counts/parameters of satellites.

The exact size (number of bits) of the hash is selected to obtain an acceptable computational cost to authenticate messages. The size of the nonce can be reduced, at the expense of increasing the Nonce collision rate for a given Terminal Key (i.e., chance of multiple terminal keys authenticating the same message); e.g., 11 bits provides 1.4 years of unique Nonces at a transmission rate of 4 messages per day. The size of the MAC determines the ability to forge messages and also detect PHY errors, with performance limited by the Birthday problem. In the embodiments just described the MAC is a 30 bit MAC. It is noted that an authentication collision can occur, as within the broker, multiple keys may be able to 'authenticate' a given message. As described herein, in some embodiments searches for authenticating keys is performed for all keys in the search partition and a received packet that authenticates against multiple terminal keys will be rejected, effectively driving up the packet loss rate. It is also possible that false authentication can occur where a rubbish (e.g., random noise) packet may be 'authenticated' by a given key. A forged or erroneously decoded packet may authenticate against a given terminal key. The likelihood of this event is reduced by increasing MAC size. The size of the MAC can therefore be chosen to minimize the probability of false authentication. In the case of forgery a hostile actor has a valid MAC and generates a message which happens to have the same MAC. Ordinarily, this is analyzed as a 'birthday attack'. Again, a larger MAC will reduce the probability of Forgery success, and MAC length can be chosen according to system requirements.

The above embodiments uses encryption schemes (for example the AES Advanced Encryption Standard) to obscure both the data and identity of the terminals. Thus without knowledge of a particular terminals encryption key, identifying transmissions that come from that terminal requires breaking the encryption protocol (i.e., breaking AES). However the above methods can add computational complexity. For example a larger number of bits may need to be dedicated to terminal identification when compared with implementations that do not attempt to obscure the identity of terminals. Also in some embodiments decryption of a message requires decryption with the key of every terminal in the partition until authentication is achieved. This can become computationally prohibitive as the number of terminals increases beyond a million or so. For example an Intel Core i7-6500U CPU running at 2.50 GHz implementing the industry standard OpenSSL library can decrypt a messages in approximately 1 microsecond, or approximately $10^{11}$ messages per day. If there are T terminals then on average T/2 decryption attempts need to be performed per message. If each terminal transmits on average 10 message a day then $5T^2$ decryption attempts will be performed per day on average. Observe that the computational complexity grows quadratically with the number of terminals. In the case that there are $T=10^6$ terminals approximately $5T^2/D \approx 50$ mid range laptops are required. Using Amazon Web Services (AWS) this would cost approximately $25K per year. If there were a billion terminals ($T=10^9$) then we the system would require $5T^2/D \approx 50 \times 10^6$ mid range laptops costing approximately $25B per year.

Accordingly a further method is described which can reduce the computational complexity whilst also increasing the security. In this approach the computational complexity is reduced by partitioning the terminals using sets of shared encryption keys. In this approach the set of terminals are partitioned into a P partitions as above, and each partition is assigned an encryption key. That is each terminal now has two keys, its own unique key as before, and the key of the partition it is in. Terminals now encrypt with both keys, that is, they:

1. first encrypt with their unique key generating a MAC of say $\tau_2$ bits; and
2. encrypt with their partition key generating another MAC (referred to as a partition MAC or pMAC) of say $\tau_1$ bits.

The two MACs are concatenated together so that the total number of MAC bits is $\tau = \tau_1 + \tau_2$. We further note that it's not actually necessary to encrypt twice, one could save some computation by encrypting only with the unique key. It is only necessary to generate the MAC bits $\tau_1$ but not actually encrypt with the partition key.

To see why using two keys in this way helps lets look at what the receiver does to decrypt and authenticate a message. The receiver:

1. attempts to authenticate with the each partition key and the first $\tau_1$ bit of the MAC;
2. discards terminals in partitions that did not authenticate;
3. attempts to authenticate with the unique key of all remaining terminals using the remaining $\tau_2$ bit of the MAC;
4. if a single terminal key authenticates, that terminal is deemed to have been the transmitter.

The computational saving are seen in step 2 where partitions that don't authenticate are discarded. The advantage of this approach is that the partitioning is done cryptographically using the MAC. An attacker requires either to break the encryption (i.e., break AES) or to obtain the partition key in order to determine which partition a transmission is from.

This approaches described the simple case where a single layer of partitions is used (e.g., as shown in FIG. 2). In this system, the set of all partition keys is known to the authentication broker 40, and each terminal knows the partition key of the partition it is in. In this embodiment the n-bit hash is the partition Message Authentication code (pMAC) generated from a partition key for the search partition (i.e., the partition containing the terminal key). Identifying the search partition comprises searching the set of partition keys for the partition key that authenticates the received pMAC. Thus the message comprises transmitting the MAC of the terminal as before, and transmitting the pMAC (as the n-bit hash). This thus reduces the computational complexity whilst also providing an even more secure system, as the n-bit hash is the pMAC, which is obtained from a cryptographic function.

The above embodiment can be further extended to provide greater reduction in computational complexity by using layers of partitions. Conceptually, for each partition we partition again, and so on, some number of times, until we get to a small partition containing a small set of terminal keys. In some embodiments the partitioning could continue down to a set of partitions each of which contain a single unique terminal key. Each terminal now has an associated list of d keys: d−1 partition keys and 1 unique terminal key. There will now be d−1 tag bits $\tau_1, \tau_2, \ldots, \tau_{d-1}$ (e.g., d−1 pMACs) that are concatenated together (or ordered in some known way) to form the n-bit hash. Conceptually the n-bit hash and MAC fields could be combined so the MAC is d−1 pMACs plus the terminal MAC.

Thus in this embodiment the partitions are grouped into hierarchical partition layers, such as a tree structure. That is, each partition has an associated partition key, and the n-bit hash is an ordered combination of each partition Message Authentication code (pMAC) generated from each partition key at each layer in a search path traversing the tree from a root node to a leaf node. The leaf node is then the search partition (i.e., the partition containing the terminal key). Identifying the search partition comprises traversing the tree by searching the set of partition keys at each layer of the tree for the partition key that authenticates the received pMAC associated with the layer determined from the ordered combination. The leaf node whose partition key authenticates the received pMAC associated with the leaf node layer is the search partition. In a further variation, each partition except leaf node partitions have an associated partition key, and leaf node partitions each comprises a single terminal key. In this embodiment, identifying the search partition comprises traversing the tree by searching the set of partition keys at each layer of the tree for the partition key that authenticates the received pMAC associated with the layer determined from the ordered combination, until a set of leaf nodes are obtained. The search partition is then the leaf node partition for which the terminal key authenticates the MAC of the terminal. In these embodiment the pMAC bits $\tau_1, \ldots, \tau_{d-1}$ corresponding with the partition keys forming the n-bit hash (and if each pMAC is p bits then n=p(d−1)). The ordered combination may be the order obtained from traversing the tree from the root node to the leaf node and the n-bit hash is a concatenation of each pMAC in the search path to the search partition. The terminal side method is outlined in FIG. 7B, in which step 713 comprises traversing the tree to find the search partition.

Figure 8:
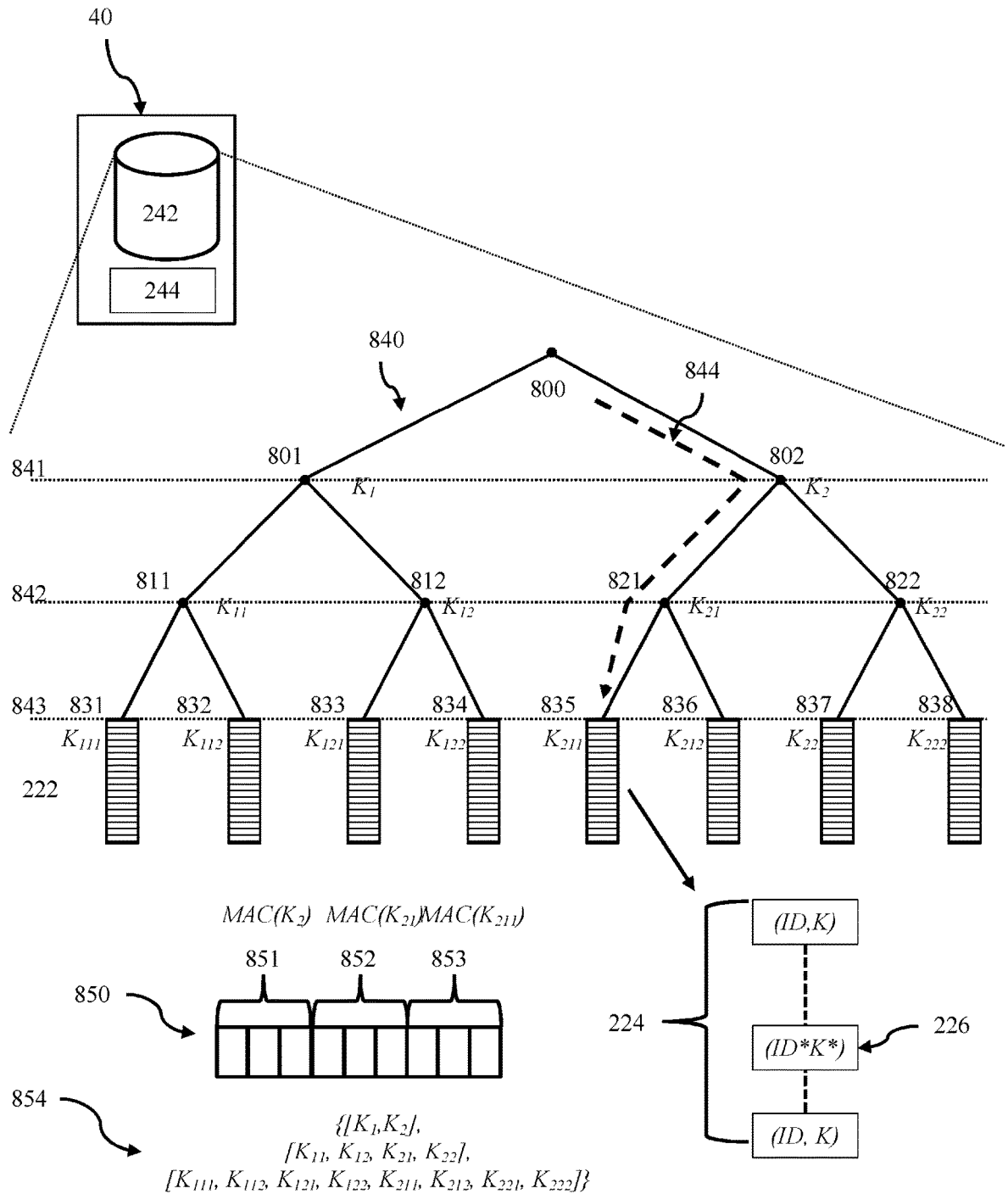
FIG. 8 is a schematic diagram illustrating hierarchical grouping of partitions according to an embodiment.

FIG. 8 is a schematic diagram illustrating hierarchical grouping of partitions in a tree structure 840. In this embodiment the tree has three levels 841, 842, 843. Note that this tree is a binary tree where each node has two children, but in other embodiments each node could have more than two children (or even a single child). In this embodiment the tree is a binary tree with root node 800, with two nodes 801 and 802 at a first level 841, four nodes 811, 812, 821, ands 822 at second level 842, and eight leaf nodes 831, 832, 833, 834, 835, 836, 837 and 838 at third level 843. Each leaf node at third level 843 comprises a partition 222 with a plurality of terminal keys (corresponding to single layer of partitions 222 shown in FIG. 2). Each of the nodes have an associated partition key 854 forming a set {[$K_1,K_2$], [$K_{11}, K_{12}, K_{21}, K_{22}$], [$K_{111}, K_{112}, K_{121}, K_{122}, K_{211}, K_{212}, K_{221}, K_{222}$]}. This set is known to the authentication broker 40 and stored in database 242, or derivable from information stored in the database 242 or similar storage entity. In one embodiment the authentication broker stores a master key, and the set of keys is obtained from a cryptographically secure pseudo-random number generator which uses the master key as the seed. The n-bit hash 850 is formed by concatenating the partition keys 851 852 853 of each layer along the path 844 from the root node to the leaf node 835 which is the search partition 224 (i.e., the partition comprising the terminal key 226). The n-bit hash 850 is thus: (MAC($K_2$), MAC($K_{21}$), MAC($K_{211}$)). In this embodiment where the pMACs are concatenated and each pMAC is p bits, the search is thus performed by obtaining the first pMAC by taking the first p bits 851 from the n-bit hash, and determining which of the first level partition keys [$K_1,K_2$], authenticates the pMAC (in this case $K_2$). We then obtain the second level pMAC by taking the next p bits 852 from the n-bit hash and determining which of the second level partition keys [$K_{11}, K_{12}, K_{21}, K_{22}$], authenticates the second pMAC (in this case $K_{21}$). Further as this is a binary tree we actually only need to test the right hand branch [$K_{21}, K_{22}$]. We then obtain the third level pMAC by taking the last p bits 853 from the n-bit hash and determining which of the third level (leaf node) partition keys [$K_{111}, K_{112}, K_{121}, K_{122}, K_{211}, K_{212}, K_{221}, K_{222}$], authenticates the third pMAC (in this case $K_{211}$). Further as this is a binary tree we actually only need to two keys on the branch [$K_{211}, K_{212}$]. We have thus found the search partition 224, and can search this for the terminal key 226 that authenticates the MAC.

The tree enables a probabilistic search through the set of keys such that the expected number of decryption attempts has order either $O(\log T)$, $O(\log^2 T)$, or $O(T^\alpha)$ where $\alpha<1$ depending upon how the tree is constructed and on the number of bits that is allocated for terminal authentication and identification. As a consequence the number of decryption attempts performed per unit time, e.g., per day, can be made to grow like $O(T \log T)$, $O(T \log^2 T)$, or $O(T^{\alpha+1})$ with the number of terminals. From the terminal perspective, to encrypt a message a terminal must now perform $O(\log T)$ iterations of the authenticated encryption scheme (e.g., AES) each with a different key. As a consequence this requires that $O(\log T)$ keys be stored by each terminal. However in practical embodiments this is not significant. For example in one embodiment each terminal stores 20 keys and each key is 16 bits long so storing 20 keys would require only 320 bits of memory. Additionally number of bits required for authentication is typically larger. The number of bits depends on the tree constructed. Typically trees that result in a smaller number of computational operations require a larger number of bits.

We can formally assess the computational complexity. We construct a tree with T leaves, one leaf for each terminal. To each edge on this tree we assign an encryption key. Each terminal is provided with the keys along the path connecting its leaf to the root node of the tree. For simplicity we will assume that these path lengths are all the same, that is, every terminal occurs at a leaf of the same depth d, and so, each terminal is assigned precisely d keys. In the simple case that a binary tree is used we would have $d=\lceil \log_2 T \rceil$. Let $$K_{1,t} K_{2,t} \ldots, K_{d,t}$$

be the d keys assigned to the $t^{th}$ terminal with $K_{1,t}$ assigned to an edge connected to the root node, i.e., at depth 1 in the tree, $K_{2,t}$ at depth 2 and so on. A terminal encrypts a message M into the ciphertext $C_0$ defined by the recursion $$C_{k-1}=eax(K_{k,t},\tau_k,C_k), k=1,\ldots,d$$

where $C_d$=M and where $\tau_1, \ldots, \tau_d$ is a sequence of tag bits dependent on the depth. This sequence is the same for every terminal. Observe that encryption amounts to applying the authenticated encryption scheme d times each with a different key and potentially a different number of tag bits. The total number of tag bits used for authentication is $\tau_1+\tau_2+\ldots+\tau_d$. In the simplest case one chooses $\tau_1=\tau_2=\ldots=\tau_d$, but we will not suppose this in what follows.

We now describe the process of decryption. Let $K_1$ be the set of keys connected to the root node of the tree, that is, the set of keys assigned to the edges of depth 1. For a key k of depth $\ell$ denote by A(k) its set of ancestor keys, that is, the keys connected via a node to k that are at depth $\ell$ +1. A set of candidate decrypted messages for ciphertext C is given by decrypt(C, $K_1$, 1) where decrypt is the set valued function defined by the recursion $$\text{decrypt}(c, K, \ell) = \cup_{k \in K} \text{decrypt}(deax(k, \tau_\ell, c), A(k), \ell+1) \quad (1)$$

and decrypt(INVALID, K, $\ell$ )=∅ where ∅ is the empty set. In practice this function can be implemented as a depth first search through the tree of keys. Observe that the recursion iterates until $\ell$ =d at which point the keys k that appear inside the union are connected to leaves of the tree and the corresponding set of ancestors A(k) are empty. It follows that $$\text{decrypt}(c, K, \ell) = \emptyset \text{ when } \ell > d. \quad (2)$$

We now analyze the computational complexity of this depth first search. To simplify the analysis we make the following assumptions:

1. The graph is balanced, that is, the number of ancestors |A(k)| is the same for every key k of degree less than d. We will denote the number of ancestor by A in what follows. It would be straightforward to extend our analysis so as to bound the complexity in the more general case that the degrees |A(k)| are bounded below a constant.

2. The computational complexity is dominated by the deax function and so it suffices to count the number of calls to the deax function, that is, it suffices to count the number of decryption attempts.

3. If c is not a valid ciphertext for key k, then deax(k, τ, c) has probability $2^{-\tau}$ of incorrectly authenticating and will otherwise return INVALID with probability $1-2^{-\tau}$.

The last of these assumptions motivates definition, for each key k, of the random variable $V_k$ equal 1 with probability $2^{-\tau_\ell}$ and zero with probability $1-2^{-\tau_\ell}$ where $\ell$ is the depth of the key. We suppose these random variables to be independent so that, for example, the expectation $\mathbb{E}\,\Pi_{k \in S} V_k = \Pi_{k \in S}\mathbb{E}\,V_k$ for every subset S of keys. Under these assumptions and for random input ciphertext c, i.e., not necessarily a valid ciphertext, the number of calls to deax required by decrypt(c, K, $\ell$) can be expressed as a recursively defined random variable $$L(K, \ell) = \sum_{k \in K}(1 + V_k L(A(K), \ell+1))$$

when $\ell \leq d$ and L(K, $\ell$)=0 for $\ell$ >d as a result of (2). We are interested in the expected number of deax calls, $$\mathbb{E}L(K, \ell) = \mathbb{E}\sum_{k \in K}(1 + V_k L(A(K), \ell+1)).$$

Because the number of ancestors is A=|K|=|A(K)| it follows that $$\mathbb{E}L(K, \ell) = A + \sum_{k \in K}\mathbb{E}[V_k L(A(K), \ell+1)].$$

Observe that L(A(K), $\ell$ +1) does not involve the key k and so L(A(K), $\ell$ +1) is independent of $V_k$ and $$\mathbb{E}L(K, \ell) = A + \sum_{k \in K}\mathbb{E}V_k\mathbb{E}L(A(K), \ell+1) = A + 2^{-\tau_\ell}A\mathbb{E}L(A(K), \ell+1)$$

The expected value depends only on the size of the set K, i.e., only on the constant number of ancestors A, and we may therefore drop the dependence on K. With this in mind let $D_\ell = \mathbb{E}\,L(K, \ell)$. The expected number of calls to deax can now be expressed as the recursion $$D_\ell = A + 2^{-\tau_\ell} A D_{\ell+1} \text{ for } \ell \leq d$$

and $D_\ell$ =0 for $\ell$ >d.

We now consider the special case where the tag bits are all equal, say, $$\tau = \tau_1 = \tau_2 = \ldots = \tau_d.$$

In this case the recursion can be identified as a geometric progression multiplied by A with solution $$D_\ell = A\frac{b^{d+1-\ell}-1}{b-1} \text{ when } b = 2^{-\tau}A \neq 1$$

and $D_\ell$ =A(d+1-$\ell$ ) when b=1. The expected number of deax calls required to compute the function decrypt(c, $K_1$, 1) is then $$D_1 = A\frac{b^d - 1}{b-1} = A\frac{A^d 2^{-d\tau} - 1}{A2^{-\tau} - 1}, \quad b \neq 1$$

and $D_1$=Ad when b=1.

The above equations model the number of calls in the case of a random ciphertext input. In the case of a valid ciphertext input all of the keys on one path will authenticate. Each valid authentication will result in another call to the decrypt from (1) resulting in approximately an additional $D_\ell$ deax calls for each $\ell$ =1, 2, . . . , d. The expected number of calls D for a valid ciphertext input can then be approximated as the sum $$D \approx \sum_{\ell=1}^{d} D_\ell = \frac{A}{b-1}\sum_{\ell=1}^{d}(b^{d+1-\ell} - 1) = \frac{A(b^{d+1} - b)}{(b-1)^2} - \frac{Ad}{b-1} \quad (3)$$

when b≠1 and $$D \approx \sum_{\ell=1}^{d} A(d+1-\ell) = \frac{Ad(d+1)}{2}, \text{ when } b = 1.$$

We now consider how the number of deax calls is related to the number of terminals T. The depth of the tree is related to the number of terminals by d=$\lceil \log_A T \rceil$. If τ>$\log_2$A so that b=$2^{-\tau}$A<1 the number of deax calls is dominated by the term Ad/(b−1) occurring (3) and so $$D=O(\log T), \tau > \log_2 A.$$

If τ<$\log_2$A so that b=$2^{-\tau}$A>1 the number of calls is dominated by the term A($b^{d+1}$−b)/(b−1)$^2$ occurring (3) and so $$D = O(b^{\log_A T - 1}) = O(T^{1/\log_b A}) = O(T^\alpha), \tau < \log_2 A$$

where $$\alpha = \frac{1}{\log_b A} = \frac{\log_2 A - \tau}{\log_2 A}.$$

Observe that α<1 in this case. Finally, consider the case when $b=2^{-\tau}A=1$. This occurs, for example, in the practical setting using a binary tree, A=2, and when a single bit is used for each tag, $\tau=\tau_1=\ldots=\tau_d=1$. In this case the expected number of deax calls is $$D \approx d^2-d=O(\log^2 T), \tau=\log_2 A.$$

Thus to summarize, in one embodiment the method comprises receiving a message transmitted from a terminal comprising at least a Message Authentication Code (MAC), a n-bit hash, and encrypted message text wherein the MAC is generated using a terminal key and a nonce. In some embodiments the nonce may also be included in the transmission. The authentication broker (or other entity) can determine how to partition the terminal keys into two or more partitions and identify the search partition that contains the key of the terminal that transmitted the received message. In some embodiments the nonce is determined by the terminal and authentication and is not sent, and the n-bit hash is obtained using a predefined partitioning function known to both the terminal and the authentication broker that uses at least the nonce and the terminal key as inputs. In embodiments where the nonce is included in the message (for example if generated by the terminal using a pseudo-random source), then the n-bit hash is selected from n-bits of the terminal key using a predefined partitioning function known to both the terminal and the authentication broker. In some cases the n-bit terminal hash and a predefined partitioning or mapping function is used which partitions or group the terminals into $2^n$ partitions (or groups) with the search partition containing the terminal key of the terminal that sent the message. Once a search partition is identified, the authentication broker can then search the determined search partition (group) for the terminal key that authenticates the MAC and decrypts the encrypted message text, and providing the terminal ID associated with the terminal key, and the decrypted message text to a system entity for further processing. Various partitioning methods may be used, for example using historical spatial (e.g., geographic), temporal or spatio temporal patterns, or other parameters that at least the authentication broker can use to partition the terminals. In some embodiments the partitions are grouped into hierarchical layers of partitions, such as tree structure, where each node of the tree has a partition key. This can reduce the computational complexity and provide enhanced security as the n-bit has is then obtained from a cryptographic function (MACs of the partition layer keys).

Similarly a method for generating an authenticated message by a terminal can be described. For cases where the authentication broker can determine how to partition the terminal keys using system or commonly known information, then the terminal encrypting and digitally signing a message for transmission without including the terminal key or terminal identifier. The method comprises generating a nonce value. The terminal generates an n-bit hash using a predefined partitioning function. This may use at least the nonce and the terminal key (and optionally the terminal ID), or it may select bits from the terminal ID. Encrypted message text can also be generated using the terminal key and nonce. A Message Authentication Code (MAC) is also generated using the nonce value and the terminal key. Finally the terminal transmits a message to the satellite comprising at least the MAC field, the n-bit terminal hash, and the ciphertext. In some embodiments the nonce is included if it can't be estimated by the authentication broker. In one embodiment the n-bit has h is formed from an ordering the MAC of the partition keys on a search path of the tree leading to the partition comprising the terminal key. That is partition function further groups a plurality of partitions into a tree comprising a plurality of hierarchical partition layers (and a partition key is associated with each partition). The n-bit hash is an ordered combination of each partition Message Authentication code (pMAC) generated from each partition key at each layer in a search path traversing the tree from a root node to a leaf node partition comprising the terminal key.

An embodiment of a method for generating terminal IDs and terminal keys, and for registering terminals (and their (ID, Key) pair) with the network will now be described. In this embodiment the terminal ID 12 is 128 bits and the terminal key is 128 or 256 bits, and these are created and assigned by the Terminal Manufacturer. Terminal manufacturers are assigned Vendor ID (e.g., 32 bit value) and a Vendor Key (e.g., 256 bit value) by a network controller:

A given Vendor ID may only be used to generate 128 OR 256 bit terminal keys, but not both and the Terminal ID and Terminal Key are installed in the terminal at manufacture. These are generated by assign a unique (to the Vendor ID), 32 bit Terminal Index (e.g., a Counter). The Terminal ID is generated as:
    HMAC(Vendor Key, "Term ID"||Vendor ID, Terminal Index).

A 128 bit Terminal Key is generated as:
    HMAC(Vendor Key, "Term Key0"||Vendor ID, Terminal Index).

Alternatively, a 256 bit Terminal Key is generated as:
    HMAC(Vendor Key, "Term Key1"||Vendor ID, Terminal Index)||
    HMAC(Vendor Key, "Term Key2"||Vendor ID, Terminal Index)
where:
    || is the concatenation operator;
    "Term ID", "Term Key0", "Term Key1", "Term Key2" are strings; and
    HMAC(key, iv, value) is defined by RFC4868.

The Vendor ID and Terminal Index are only used to register a terminal with the communication network and are not secret. When registering either over the air, or via a scanned QR code the Vendor ID and Terminal Index are sent in clear text, but are digitally signed using the Terminal Key. An additional "Vendor ID Mask" may be used to control the range of Terminal Indexes available to a given Vendor ID. This would work in the same fashion as IPv4 subnet masks. The Vendor ID mask need not be included in the registration message.

A single Terminal ID/Terminal Key value (e.g., 0) will be reserved for device registration. A number of additional pairs, e.g., 1 thru 2^16-1 may be reserved for the transmission of anonymous data, e.g., temperature, however such anonymous data cannot be authenticated.

A terminal must 'register' with the network before packets are able to be received (that is the Authentication Broker 40 will reject and discard any messages not from a registered terminal. The process of registration adds the Terminal and in particular the (terminal ID, terminal Key) pair to the set of Terminal ID/Key pairs which are searched. For example they are added to database 242 used by the Authentication Broker 40.

Figure 3A:
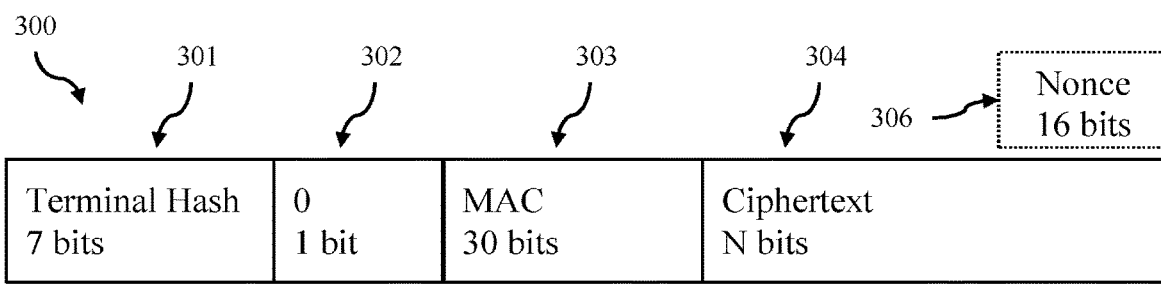
FIG. 3A is a schematic diagram of a first frame structure of a message according to an embodiment.
Figure 3B:
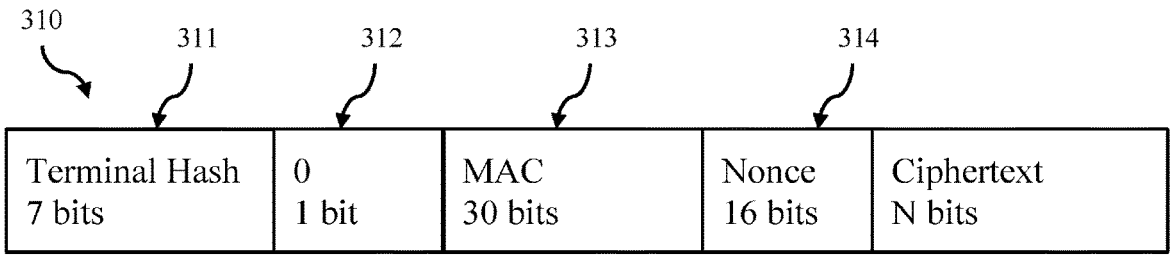
FIG. 3B is a schematic diagram of a second frame structure of a message according to an embodiment.
Figure 3C:
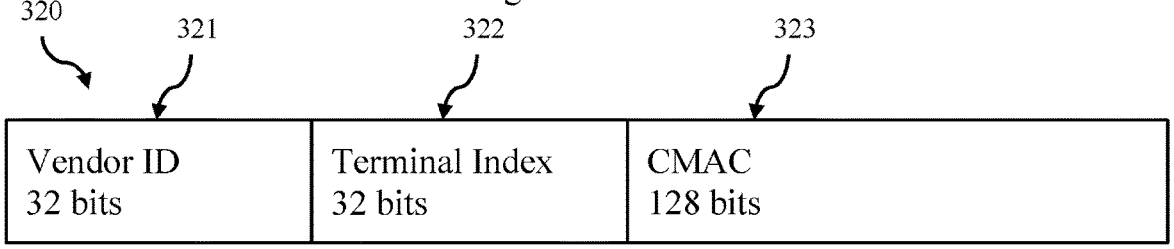
FIG. 3C is a schematic diagram of a frame structure of a registration message according to an embodiment.

FIG. 3C is a schematic diagram of a frame structure 320 of a registration message according to an embodiment. This comprises a Vendor ID 321 (in this case 32 bits), a Terminal index 322 (in this case 32 bits) and a CMAC 323 (in this case 128 bits). The Vendor ID and Terminal Index are as described above and the CMAC uses the Terminal Key to digitally sign the Vendor ID||Terminal Index. Server (or receive) side, the Vendor Key and Vendor ID are used to generate the Terminal ID and Terminal Key. Once the message is authenticated, the Terminal ID/Key are added to the Terminal search space.

Registration may also be performed via QR Code. The registration payload is directly encoded as a QR code (or other similar technique). The Registration App would then associate the message with additional meta-data.

In over the air Registration, the plaintext Vendor ID||Terminal Index may be concatenated with additional meta-data. Any additional meta-data should be encrypted via the Terminal Key and the entire message, including encrypted meta-data signed. Additional information may include Customer ID, etc. In the case additional meta-data is included, a cleartext Nonce may also be required to prevent replay attacks.

The system may be used in a satellite communication system comprising a plurality of terminals and a plurality of access nodes, and in particular a communication system featuring a plurality of satellite access nodes. One such communication system is the global sensor network developed by Myriota, for example described in WO 2014/043760 and WO 2016/090411. This system has been designed to enable a remote internet of things, by developing efficient communication methods and architectures to support a large number of distributed and typically low powered terminals (for example battery terminals). The method described herein are particularly suited to use in such systems. However it will be realized that various embodiments may be used in other communication systems including those with various combinations of satellite access nodes, airborne access nodes, and terrestrial access nodes (including mobile terrestrial access nodes) or various combinations of the three, including purely airborne, or purely terrestrial access nodes.

Embodiments of a method to uniquely identify transmitting terminals within a communications network in which transmissions omit the terminal identifier using the digital signature applied to packets (in addition to the ordinary role of validating the authenticity and validity of messages) have been described. The set of all terminal keys are partitioned into two or more partitions and a search partition is identified which contains the terminal key of the terminal which sent a transmission. This partitioning of the total system key space reduces the compute cost of attempting to authenticate a received message with every possible terminal key, allowing a restricted search to be performed of just the keys in the search partition. The search may be performed using system information known to, or derivable/estimable by the receiver, or using common information known to, or derivable/estimable by, both the transmitter and receiver, or the message may include information to assist the receiver in identifying the search partition. In some embodiments a Nonce value is used and can be independently derived (i.e., it is not transmitted in the message) and used by both the terminal and authentication broker (or Core Network entity), and in other embodiments a Nonce is transmitted and used with a partitioning or mapping function to allow the terminal to be identified. Omission of the Nonce allows the use of a smaller header and provides absolute terminal anonymity but requires knowledge of some way to calculate the nonce, such as satellite orbital parameters (e.g., access to a timing reference and up-to-date ephemeris data). Inclusion of a Nonce eliminates these requirements but only partially obfuscates the Terminal ID and requires some additional header information. The inclusion of terminal hashes and nonces acts as a partition identification code. In some embodiments the partitions are hierarchically grouped, for example into a tree structure where each node is assigned a partition key. The n-bit hash can then be formed from ordering the partition key MACs for example by concatenation. This has the advantage of providing greater security as the n-bit hash is obtained from cryptographic functions (i.e., the MACs of the partition keys). In addition to standard security objectives, these methods are designed to minimize the overhead required to be transmitted between terminal and base station leaving more room for actual data. Associated methods for generating messages as well as registration of terminals are also provided.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Aspects of the system may be a computer implemented using a computing device or apparatus which comprises one or more processors and a memory, and optionally input devices (e.g., keyboard, mouse, etc.) and output devices (e.g., a display). These may be integrated in receiver and transmitter apparatus or be in communication with receiver and transmitter apparatus, for example to perform specialized calculations on behalf of the receiver and transmitter apparatus. The memory may comprise instructions to cause the processor to execute aspects or steps of a method described herein. The processor and memory may be included in a standard computing device, such as a server, desktop computer, a portable computing device such as a laptop computer or tablet, or they may be included in a customized device or system. The computing device may be a unitary computing or programmable device, or a distributed device comprising several components operatively (or functionally) connected via wired or wireless connections. The one or more processors may comprise a central processing unit (CPU) comprising an Input/Output Interface, an Arithmetic and Logic Unit (ALU) and a Control Unit and Program Counter element which is in communication with input and output devices through the Input/Output Interface. The Input/Output Interface may comprise a network interface and/or communications module for communicating with an equivalent communications module in another device using a predefined communications protocol (e.g., Bluetooth, Zigbee, IEEE 802.15, IEEE 802.11, TCP/IP, UDP, etc.). A graphical processing unit (GPU) may also be included. The display apparatus may comprise a flat screen display (e.g., LCD, LED, plasma, touch screen, etc.), a projector, CRT, etc. The computing device may comprise a single CPU (core) or multiple CPU's (multiple core), or multiple processors. The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules or instructions. The processor(s) may be configured to load and executed the software modules or instructions stored in the memory.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application or applications described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope as set forth and defined by the following claims.

The invention claimed is:

1. A method for determining a terminal identifier from a message received from a terminal in a communications system, the method comprising:

receiving, by an access node in a communication system comprising a plurality of access nodes, an authentication broker operatively connected to the plurality of access nodes, and a plurality of terminals, a message transmitted from a terminal having a unique terminal identifier, and terminal key, wherein the received message comprises at least a Message Authentication Code, a n-bit hash, and encrypted message text, and where at least the terminal key and a nonce is used to generate the Message Authentication Code, and neither the terminal identifier nor the terminal key are included in the transmitted message;

providing at least the received Message Authentication Code and n-bit hash to the authentication broker, wherein the authentication broker stores the set of all terminal identifier and terminal key pairs for the plurality of terminals in the communication system;

partitioning the set of terminal keys into at least two partitions, and identifying a search partition including the terminal key of the terminal that transmitted the received message using the n-bit hash;

searching the search partition for the terminal key that authenticates the Message Authentication Code; and identifying the terminal identifier using the terminal key that that authenticates the Message Authentication Code.

2. The method as claimed in claim 1, wherein the nonce is not included in the received message and a predefined partitioning function known to the terminal and the authentication broker is used to generate a n-bit hash from at least the nonce and a terminal key, and the method further comprises obtaining the nonce, wherein the nonce is obtained using either system information known to, or estimable by the authentication broker, or common information known to, or estimable by, both the terminal and the authentication broker.

3. The method as claimed in claim 2, wherein partitioning the set of terminal keys comprises generating, for each terminal a n-bit test value by using the obtained nonce with the terminal key as inputs to the predefined partitioning function, and grouping terminals with the same n-bit hash, and identifying the search partition comprises selecting the partition with terminals whose n-bit test value matches the received n-bit hash.

4. The method as claimed in claim 2, further comprising estimating a geographic region from which the transmission was received, and obtaining the nonce is performed using the last known position for each terminal in the system over a predefined time window, and the search partition contains the terminals whose last known position was within the estimated geographic region.

5. The method as claimed in claim 2, wherein obtaining the nonce is performed using timing or frequency patterns of transmissions from terminals in the communication system, and the search partition is identified based on the time of the received transmission.

6. The method as claimed in claim 2, wherein the nonce value is obtained by determining a current value of a counter at a time determined with respect to the transmission time of the message, wherein the counted with respect to a predetermined reference time and increment point, and the counter is based on a parameter of a satellite orbit known to the receiver and transmitter, calculated at an estimated time of transmission of the message, wherein the reference time is a reference epoch and the increment point is a predetermined orbital reference point.

7. The method as claimed in claim 2, wherein the number of partitions is two and the partitioning and searching are performed concurrently by iterating through the set of all terminal keys by:
 calculating, for a terminal, an n-bit test value obtained from applying the predefined partitioning function to the terminal key and nonce; and
 determining, for a terminal, if the n-bit test value matches the received n-bit hash, and if the n-bit test value matches the received n-bit hash then determining if the terminal key and nonce successfully authenticate the Message Authentication Code.

8. The method as claimed in claim 1 wherein the nonce is included in the received message and a predefined partitioning function known to the terminal and the authentication broker is used to generate a n-bit hash by using the nonce to select n bits from the terminal identifier, and partitioning the set of terminal keys comprises generating, a n-bit test value for each terminal by using the received nonce and terminal identifier as input to the predefined partitioning function, and grouping terminals with the same n-bit hash, and identifying the search partition comprises selecting the partition with terminals whose n-bit test value matches the received n-bit hash.

9. The method as claimed in claim 8 wherein the nonce is generated from a pseudo random source by the terminal.

10. The method as claimed in claim 8, wherein the predefined partitioning function generates an n-bit test value from the nonce and a terminal identifier by:
 partitioning the terminal identifier into m n-bit non-overlapping portions; and
 calculating the value j modulo m of a predefined k-bit portion of the nonce, subject to the requirement that $2^k \geq m$ and selecting the j modulo m n-bit portion of the L bit terminal identifier.

11. The method as claimed in claim 10, wherein the predefined k-bit portion of the nonce is the first or last k-bit portion of the nonce.

12. The method as claimed in claim 1 wherein the nonce is included in the received message and partitioning the set of terminal keys comprises generating m partitionings prior to receiving a message, and where the jth partitioning of the m partitionings is obtained by:
 selecting the jth n-bit portion of each terminal identifier, and grouping terminals with the same jth n-bit portion of their terminal identifier to form $2^n$ partitions, for each j=1 . . . m; and
 upon receiving a message calculating the value j modulo m of a predefined k-bit portion of the nonce, subject to the requirement that $2^k > m$, and identifying the search partition comprises selecting the partition in the jth partitioning of the m partitionings which is comprised of terminal keys in which the n-bit portion of their terminal identifier matches the received n-bit hash.

13. The method as claimed in claim 1, wherein each of the at least two partitions has an associated partition key, and the n-bit hash comprises a partition Message Authentication code generated from a partition key for the search partition, and identifying the search partition comprises searching the set of partition keys for the partition key that authenticates the received partition Message Authentication code.

14. The method as claimed in claim 13, wherein the at least two partitions are a plurality of partitions grouped into a tree to form a plurality of hierarchical partition layers, where each partition has an associated partition key, and the n-bit hash is an ordered combination of each partition Message Authentication code generated from each partition key at each layer in a search path traversing the tree from a root node to a leaf node comprising the search partition, and identifying the search partition comprises traversing the tree by searching the set of partition keys at each layer of the tree for the partition key that authenticates the received partition Message Authentication code associated with the layer determined from the ordered combination, wherein the leaf node whose partition key authenticates the received partition Message Authentication code associated with the leaf node layer is the search partition.

15. The method as claimed in claim 14, wherein the ordered combination is the order obtained from traversing the tree from the root node to the leaf node and the n-bit hash is a concatenation of each partition Message Authentication code in the search path to the search partition.

16. The method as claimed in claim 13, wherein the at least two partitions are a plurality of partitions grouped into a tree to form a plurality of hierarchical partition layers, where each partition except leaf node partitions have an associated partition key, and leaf node partitions each comprises a single terminal key, and the n-bit hash is an ordered combination of each partition Message Authentication code generated from each partition key at each layer in a search path traversing the tree from a root node to a leaf node, and identifying the search partition comprises traversing the tree by searching the set of partition keys at each layer of the tree for the partition key that authenticates the received partition Message Authentication code associated with the layer determined from the ordered combination, until a set of leaf nodes are obtained, and the search partition is the leaf node partition for which the terminal key authenticates the Message Authentication Code of the terminal.

17. The method as claimed claim 1, wherein a plurality of predefined partitioning functions are used to partition the set of terminal keys, and the message further comprises at least a 1 bit indicator field which is used by the authentication broker to determine which predefined partitioning function from the plurality of predefined partitioning functions is to be used to partition the set of terminal keys.

18. The method as claimed in claim 17, wherein the partition function further groups a plurality of partitions into a tree comprising a plurality of hierarchical partition layers, and a partition key is associated with each partition, and the n-bit hash is an ordered combination of each partition Message Authentication code generated from each partition key at each layer in a search path traversing the tree from a root node to a leaf node partition comprising the terminal key.

19. A method for generating an authenticated message by a terminal for transmission to an access node in a satellite communications system comprising a plurality of terminals, a plurality of access nodes and an authentication broker, wherein each terminal stores a unique terminal identifier and terminal key and the authentication broker stores the set of terminal identifier and terminal key pairs for each of the plurality of terminals, the method comprising:
generating a nonce value;
encrypting a message for transmission using a terminal key stored by the terminal and the nonce value to obtain encrypted message text or obtaining encrypted message text for transmission;
generating, by the terminal, an n-bit hash using a predefined partitioning function that either generates the n-bit hash from the at least the terminal key and the nonce or that generates a n-bit test value by selecting n bits from the terminal identifier, or where the n-bit hash comprises one or more partition Message Authentication code generated from a partition key associated with a partition that comprises the terminal key;
generating a Message Authentication Code using at least the nonce and the terminal key; and
transmitting to an access node in the plurality of access nodes, by the terminal, a message comprising at least the n-bit hash, the Message Authentication Code, and the encrypted message text.

20. The method as claimed in claim 19 wherein the nonce value is determined using common information known to, or estimable by, both the terminal and the authentication broker, and the nonce is not transmitted, and a predefined partitioning function generates the n-bit hash from the at least the terminal key and the nonce.

21. The method as claimed in claim 20 wherein the nonce value is obtained by determining the current value of a counter at a time determined with respect to the transmission time of the message, wherein the counter is based on a parameter of the satellite orbit known to the receiver and transmitter, and is counted with respect to a predetermined reference time and increment point.

22. The method as claimed in claim 19 wherein the nonce is generated from a pseudo random source and is transmitted in the message, and the predefined partitioning function generates the n-bit terminal hash by selecting n bits from the terminal identifier.

23. The method as claimed in claim 22 wherein generating the n-bit terminal hash comprises:
selecting a predefined k-bit portion of the nonce;
partitioning the terminal identifier into m n-bit non overlapping portions subject to $2^k \geq m$
calculating the value j modulo m of the k-bit portion of the nonce value; and
selecting the $j^{th}$ n-bit portion of the terminal identifier as the n-bit terminal hash.

24. An authentication broker apparatus comprising at least one processor and at least one memory comprising instructions to configure the processor to determine a terminal identifier from a message received from a terminal in a communications system,
wherein the at least one memory stores the set of all terminal identifier and terminal key pairs for a plurality of terminals in a communication system wherein each terminal has a unique terminal identifier, and terminal key, and stores instructions to configure at least one processor to,
receive a Message Authentication Code and a n-bit hash from an access node In the communication system, wherein the Message Authentication Code and n-bit hash are extracted from a message received by the access node from a terminal, wherein the received message does not include the terminal identifier or the terminal key of the terminal,
partitioning the set of terminal keys into at least two partitions, and identifying a search partition including the terminal key of the terminal that transmitted the received message using the n-bit hash,
searching the search partition for the terminal key that authenticates the Message Authentication Code; and
identifying the terminal identifier using the terminal key that that authenticates the Message Authentication Code.

25. A terminal apparatus comprising an antenna, communications hardware comprising a transmitter, at least one processor and at least one memory;
wherein, the at least one memory stores a unique terminal identifier and terminal key and stores instructions to configure at least one processor to:
generate a nonce value,
encrypt a message for transmission using the terminal key and the nonce value to obtain encrypted message text or obtain an encrypted message text for transmission;
generate a n-bit hash using a predefined partitioning function that either generates the n-bit hash from the at least the terminal key and the nonce or that generates a n-bit test value by selecting n bits from she terminal identifier, or where the n-bit hash comprises one or more partition Message Authentication code generated from a partition key associated wish a partition that comprises the terminal key,
generate a Message Authentication Code using at least the nonce and the terminal key; and
transmit a message comprising at least the n-bit hash, the Message Authentication Code, and the encrypted message text.

* * * * *